(12) United States Patent
Zhu

(10) Patent No.: US 11,895,686 B2
(45) Date of Patent: Feb. 6, 2024

(54) METHOD, DEVICE AND MEDIUM FOR TRANSMITTING INFORMATION

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 424 days.

(21) Appl. No.: 17/290,589

(22) PCT Filed: Nov. 1, 2018

(86) PCT No.: PCT/CN2018/113525
§ 371 (c)(1),
(2) Date: Apr. 30, 2021

(87) PCT Pub. No.: WO2020/087466
PCT Pub. Date: May 7, 2020

(65) Prior Publication Data
US 2021/0377970 A1    Dec. 2, 2021

(51) Int. Cl.
*H04W 72/50* (2023.01)
*H04W 16/14* (2009.01)
*H04W 74/08* (2009.01)

(52) U.S. Cl.
CPC ......... *H04W 72/535* (2023.01); *H04W 16/14* (2013.01); *H04W 74/0808* (2013.01)

(58) Field of Classification Search
CPC ............... H04W 72/23; H04W 72/535; H04W 72/1273; H04W 16/14; H04W 74/0808
See application file for complete search history.

(56) References Cited

U.S. PATENT DOCUMENTS

2016/0044516 A1* 2/2016 Hedayat ............... H04W 16/14
                                                    370/329
2017/0041950 A1* 2/2017 Wang ................. H04W 74/006
(Continued)

FOREIGN PATENT DOCUMENTS

CN     106161312 A     11/2016
CN     107079333 A      8/2017
(Continued)

OTHER PUBLICATIONS

Indian Patent Application No. 202147023597, Office Action dated Mar. 10, 2022, 6 pages.
(Continued)

*Primary Examiner* — Kan Yuen
(74) *Attorney, Agent, or Firm* — COZEN O'CONNOR

(57) ABSTRACT

A method for transmitting information is applicable to a terminal and includes: buffering data information carried by an unlicensed spectrum resource; acquiring a target scheduling instruction issued by a base station, the target scheduling instruction being configured to indicate resource configuration information of a preceding downlink transmission resource, and the preceding downlink transmission resource referring to an unlicensed spectrum resource that has completed transmission for downlink data before the base station issues scheduling information on the resource; acquiring target information sent by the base station from the buffered data information according to the target scheduling instruction.

16 Claims, 18 Drawing Sheets

(56) References Cited

U.S. PATENT DOCUMENTS

| | | | |
|---|---|---|---|
| 2017/0251373 A1 | 8/2017 | Ding et al. | |
| 2017/0310422 A1* | 10/2017 | Baker | H04L 5/0091 |
| 2018/0279211 A1* | 9/2018 | Lunttila | H04L 5/0048 |
| 2020/0178268 A1* | 6/2020 | Duengen | H04W 74/004 |
| 2020/0259621 A1* | 8/2020 | Oh | H04L 1/1825 |
| 2020/0403749 A1* | 12/2020 | Park | H04L 5/0048 |
| 2021/0289364 A1* | 9/2021 | Patel | H04W 72/569 |

FOREIGN PATENT DOCUMENTS

| | | |
|---|---|---|
| CN | 107113115 A | 8/2017 |
| KR | 101885449 B1 | 8/2018 |
| WO | WO 2016/090567 A1 | 6/2016 |
| WO | WO 2016121006 A1 | 8/2016 |
| WO | WO 2016161558 A1 | 10/2016 |
| WO | WO 2018028325 A1 | 2/2018 |

OTHER PUBLICATIONS

European Patent Application No. 18938349.0 Search and Opinion dated Jun. 1, 2022, 9 pages.
Panasonic "Discussion on flexible transmission time in LAA"; 3GPP Draft R1-150318; Feb. 2015, 4 pages.
PCT/CN2018/113525, English translation of International Search Report dated Jun. 3, 2019, 2 pages.

\* cited by examiner

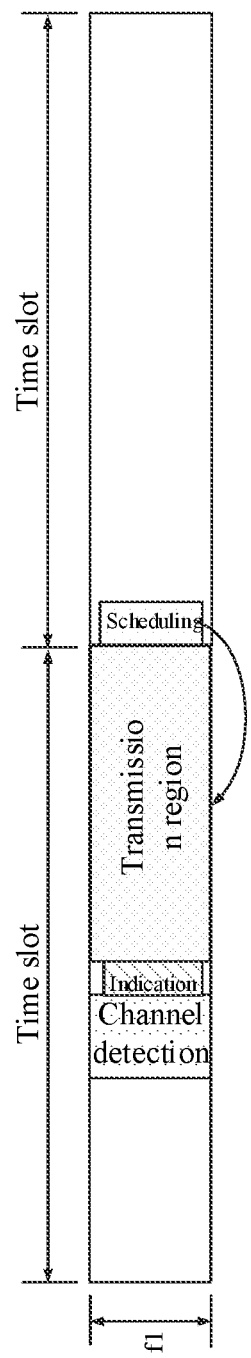

METHOD, DEVICE AND MEDIUM FOR TRANSMITTING INFORMATION

CROSS-REFERENCE TO RELATED APPLICATION

This application is a U.S. national phase of International Application No. PCT/CN2018/113525, filed on Nov. 1, 2018, the entire contents of which are incorporated herein by reference.

TECHNICAL FIELD

The present disclosure relates to the field of communication technologies, and more particularly, to a method, a device, a base station, and a terminal for transmission.

BACKGROUND

With the gradual evolution of mobile communication networks to 5G NR (New Radio) systems, mobile communication systems have opened up many new frequency resources for information transmission, and the adoption of high-frequency spectrum is one feature of new mobile communication systems such as 5G NR. Another feature of the new mobile communication systems opening up new frequency bands is the extensive use of frequency band resources of unlicensed spectrum such as 2.4 GHz, 5 GHz for information transmission.

When a base station and a terminal are working in unlicensed spectrum, because they need to compete with other systems such as Wi-Fi for an unlicensed spectrum resource, they also need to follow the channel detection mechanism as well, similar to the LBT (listen before talk) detection mechanism of the Wi-Fi system. Regarding the channel detection mechanism, in the wireless communication system, when an information sending side needs to use an unlicensed spectrum resource to transmit information to an information receiving side, first idle channel detection will be performed in the unlicensed spectrum to determine whether there are currently available resources. Therefore, when the base station transmits information in the unlicensed spectrum, there is uncertainty in channel occupancy. If the base station still uses the resource scheduling method of the licensed spectrum, that is, the base station can notify the UE through scheduling signaling to use a resource of a preset size for information transmission in the following time-domain, when the base station uses an unlicensed spectrum resource to transmit information, it is very likely that the scheduled resource cannot transmit data because it is being occupied by equipment of other systems such as a Wi-Fi system.

SUMMARY

According to a first aspect of the embodiments of the present disclosure, a method for transmitting information is provided, which is applied into a terminal, and which includes:
 buffering data information carried by an unlicensed spectrum resource;
 acquiring a target scheduling instruction issued by a base station, the target scheduling instruction being configured to indicate resource configuration information of a preceding downlink transmission resource, and the preceding downlink transmission resource referring to the unlicensed spectrum resource that has completed transmission for downlink data before the base station issues scheduling information on the resource;
 acquiring target information sent by the base station from the buffered data information according to the target scheduling instruction.

According to a second aspect of the embodiments of the present disclosure, a method for transmitting information is provided, which is applied into a base station, and which includes:
 performing a downlink data transmission by using an idle channel resource after a successful channel detection of an unlicensed spectrum resource;
 determining resource configuration information corresponding to a preceding downlink transmission resource configured to carry the downlink data transmission, the resource configuration information at least including: time-domain resource configuration information;
 determining a scheduling instruction for the preceding downlink transmission resource according to the resource configuration information;
 sending the scheduling instruction to a terminal, so as to enable the terminal to acquire target information sent by the base station from buffered data information according to the scheduling instruction.

According to a third aspect of the embodiments of the present disclosure, a non-transitory computer-readable storage medium is provided, on which computer instructions are stored, the instructions when being executed by a processor, implement the steps of any of the methods of the above described first aspect.

According to a fourth aspect of the embodiments of the present disclosure, a non-transitory computer-readable storage medium is provided, on which computer instructions are stored, the instructions when being executed by a processor, implement the steps of the method of the above described second aspect.

According to a fifth aspect of the embodiments of the present disclosure, a terminal is provided, which includes:
 a processor;
 a memory for storing instructions executable by the processor;
 wherein the processor is configured to:
 buffer data information carried by an unlicensed spectrum resource;
 acquire a target scheduling instruction issued by a base station, the target scheduling instruction being used to indicate resource configuration information of a preceding downlink transmission resource, and the preceding downlink transmission resource referring to the unlicensed spectrum resource that has completed transmission for downlink data before the base station issues scheduling information on the resource;
 acquire target information sent by the base station from the buffered data information according to the target scheduling instruction.

According to a sixth aspect of the embodiments of the present disclosure, a base station is provided, which includes:
 a processor;
 a memory for storing instructions executable by the processor;
 wherein the processor is configured to:
 perform a downlink data transmission by using an idle channel resource after a successful channel detection of an unlicensed spectrum resource;

determine resource configuration information corresponding to a preceding downlink transmission resource configured to carry the downlink data transmission, the resource configuration information at least including: time-domain resource configuration information;

determine a scheduling instruction for the preceding downlink transmission resource according to the resource configuration information;

send the scheduling instruction to a terminal, so as to enable the terminal to acquire target information sent by the base station from buffered data information according to the scheduling instruction.

It should be appreciated that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show embodiments in accordance with the present invention, and together with the specification are used to explain the principle of the present invention.

FIG. 5-1 is a schematic diagram of another application scenario for transmitting information shown according to an exemplary embodiment of the present disclosure.

FIG. 5-2 is a schematic diagram of another application scenario for transmitting information shown according to an exemplary embodiment of the present disclosure.

FIG. 7-1 is a schematic diagram of another application scenario for transmitting information shown according to an exemplary embodiment of the present disclosure.

FIG. 7-2 is a schematic diagram of another application scenario for transmitting information shown according to an exemplary embodiment of the present disclosure.

DETAILED DESCRIPTION

Figure 1:
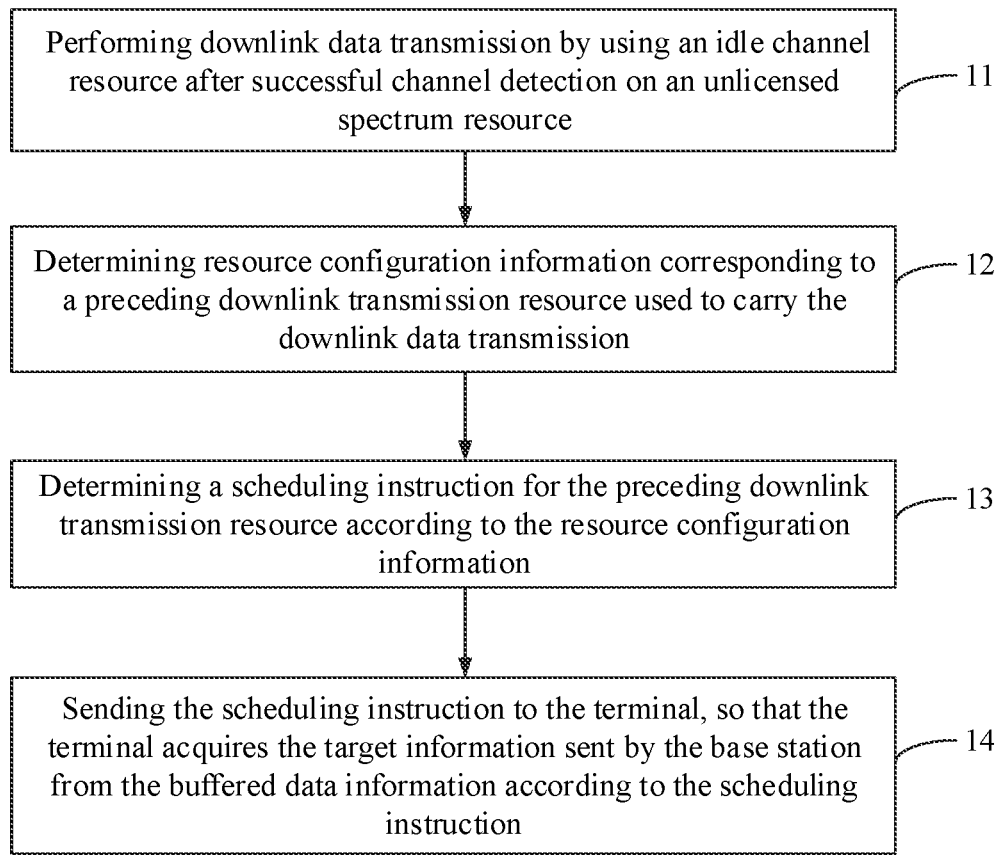
FIG. 1 is a flow chart of a method for transmitting information shown according to an exemplary embodiment of the present disclosure.

Here, exemplary embodiments will be explained in detail, and examples thereof are shown in the accompanying drawings. When the following description relates to the drawings, unless otherwise indicated, the same numbers in different figures indicate the same or similar elements. Implementations described in the following exemplary embodiments do not represent all implementations consistent with the present invention. On the contrary, they are merely examples of devices and methods consistent with some aspects of the present invention as detailed in the appended claims.

The terms used in the present disclosure are only for the purpose of describing specific embodiments, and are not intended to limit the present disclosure. The singular forms of "a", "said" and "the" used in the present disclosure and the appended claims are also intended to include plural forms, unless the context clearly indicates other meanings. It should also be appreciated that the term "and/or" as used herein refers to and includes any or all possible combinations of one or more associated listed items.

It should be appreciated that although the terms first, second, third, etc. may be used in the present disclosure to describe various information, these items of information should not be limited to these terms. These terms are only used to distinguish the same type of information from each other. For example, without departing from the scope of the present disclosure, first information may also be referred to as second information, and similarly, second information may also be referred to as first information. Depending on the context, the word "if" as used herein can be interpreted as "while" or "when" or "in response to determining".

Executive bodies involved in the present disclosure include: base stations and terminals (User Equipment, UE) in mobile communication networks such as systems of 4G LTE (Long Term Evolution), LTE-NR interworking (interoperability), and 5G NR, wherein the base station may be a base station, a sub-base station, etc., provided with a large-scale antenna array. The user equipment may be a user terminal, a user node, a mobile terminal or a tablet computer, etc. In a specific implementation process, the base station and the user equipment are independent of each other, and at the same time they are connected to each other, to jointly implement the technical solutions provided by the present disclosure.

An application scenario of the present disclosure is: a base station uses an unlicensed spectrum resource to send data to a target UE. If the base station follows the resource scheduling method in the related technology, such as the resource scheduling method of a licensed spectrum, that is, first issues a scheduling instruction to the target UE, and then schedules a downlink transmission resource according to the scheduling instruction, due to the problem of uncertainty of channel occupancy in the unlicensed spectrum, it is very likely to cause the scheduled transmission resource to fail to successfully transmit downlink data to the target UE.

Based on this, the present disclosure provides a method for transmitting information, which can be applied into a base station. Referring to FIG. 1 showing a flowchart of a method for transmitting information according to an exemplary embodiment, the method may include the following steps:

In block 11, after successful channel detection on an unlicensed spectrum resource, an idle channel resource is used for downlink data transmission;

In the present disclosure, the base station can perform channel detection on a channel resource within a preset frequency range of an unlicensed spectrum according to the target UE's ability to send and receive information in the unlicensed spectrum, and use an idle channel resource for downlink data transmission after successful channel detection.

Figure 2:
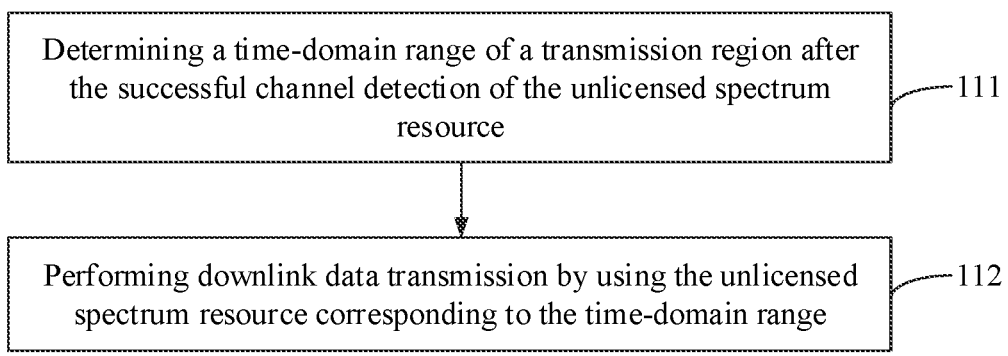
FIG. 2 is a flow chart of another method for transmitting information shown according to an exemplary embodiment of the present disclosure.

Referring to FIG. 2 showing a flowchart of another method for transmitting information according to an exemplary embodiment, the aforementioned step 11 may include:

In block 111, after the successful channel detection of the unlicensed spectrum resource, a time-domain range of a transmission region is determined;

In the present disclosure, after the successful channel detection, the base station will first determine the time-domain range of an available resource, that is, the time-domain range of the transmission region.

Wherein the base station can use the following two ways to determine the above time-domain range of the transmission region:

In a first way, it is determined according to preset time-domain resource configuration information.

That is, the above time-domain range of the resources available in the unlicensed spectrum and used to carry downlink data transmission may be pre-appointed by the system, such as the Maximum Channel Occupancy Time (MCOT) appointed by the system, for example, 10 ms. Then, the base station can use the above transmission resource corresponding to the MCOT to perform downlink data transmission after the successful channel detection. Wherein the time-domain range of the above transmission resource is the time range corresponding to the MCOT, and the corresponding frequency domain range is the frequency range of the current unlicensed spectrum channel. As in the above example, assuming that the base station determines that the channel detection is successful at time T0, the time-domain range of the above transmission resource is: T0~T0+10 ms.

In a second way, it is determined by the base station in real time according to the amount of downlink data to be transmitted.

In another embodiment of the present disclosure, if the capability of the base station is strong, the base station can also strive for sufficiently long time-domain resources according to the amount of downlink data to be transmitted to reduce the transmission time of downlink data to be transmitted. For example, all downlink data transmission for the aforementioned target UE will be completed at one time. In this case, the base station can dynamically determine the time-domain range of the transmission region according to the amount of downlink data to be transmitted.

In block 112, the unlicensed spectrum resource corresponding to the time-domain range is used to perform the downlink data transmission.

After determining the time-frequency range of the transmission region, the base station can perform downlink data transmission. Difference from the related technology, after determining the time-frequency resource range of the transmission region, the base station does not send the resource scheduling information corresponding to the aforementioned transmission region to the target UE before performing downlink data transmission.

In block 12, resource configuration information corresponding to a preceding downlink transmission resource used to carry the downlink data transmission is determined;

In the present disclosure, the preceding downlink transmission resource refers to the resource that has carried the downlink data transmission before the base station sends the scheduling signaling. The resource configuration information of the preceding downlink transmission resource includes at least: configuration information of the time-domain resource. The configuration information of the time-domain resource may indicate the time-domain range of the aforementioned preceding downlink transmission resource.

In block 13, a scheduling instruction for the preceding downlink transmission resource is determined according to the resource configuration information;

In the present disclosure, the implementation of the aforementioned step 13 may include the following at least three cases:

In a first case, the base station generates the aforementioned scheduling instruction according to the configuration information of the preceding downlink transmission resource, and the aforementioned scheduling instruction includes at least: time-domain range information of the preceding downlink transmission resource. This case is particularly applicable to an application scenario where the base station determines the transmission region corresponding to the preceding downlink transmission resource in the second way described above.

In a second case, the system can appoint two types of time-domain resource configuration information, which respectively correspond to the time-domain resource configuration information when the base station schedules a preceding downlink transmission resource and a following downlink transmission resource.

As described above, in the present disclosure, the preceding downlink transmission resource refers to that, when the base station sends the scheduling information of the transmission resource to the target UE, the base station has completed the downlink data transmission by using the transmission resource.

On the contrary, the following downlink transmission resource refers to that, when the base station issues the scheduling information of the transmission resource to the target UE, the base station has not scheduled the transmission resource for downlink data transmission. In general, the base station will schedule the transmission resource for downlink data transmission after a preset period of time after issuing the scheduling information of the transmission resource.

In the present disclosure, the aforementioned time-domain resource configuration information at the time when the base station schedules the preceding downlink transmission resource, which is appointed by the system, is referred to as time-domain resource configuration information of a first-type.

The aforementioned time-domain resource configuration information at the time when the base station schedules the following downlink transmission resource, which is appointed by the system, is referred to as time-domain resource configuration information of a second-type.

Figure 3:
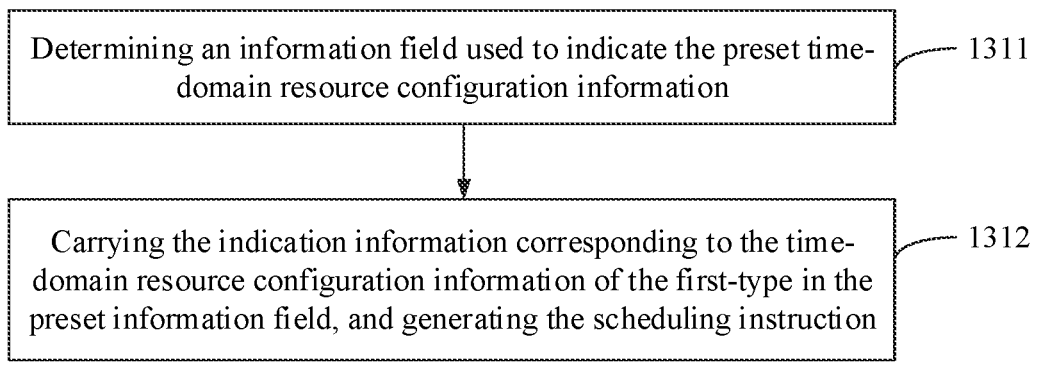
FIG. 3 is a flow chart of another method for transmitting information shown according to an exemplary embodiment of the present disclosure.

Based on this, referring to FIG. 3 showing a flowchart of another method for transmitting information according to an exemplary embodiment, the aforementioned step 13 may include:

In block 1311, an information field used to indicate the preset time-domain resource configuration information is determined;

In an embodiment of the present disclosure, the system may appoint information on the information field for the scheduling signaling, which information field being used to carry indication information of the preset time-domain resource configuration information. The aforementioned information on the information field may include: the position of the information field in the scheduling signaling, the size of the information field, and other information.

In another embodiment of the present disclosure, before generating the scheduling signaling, the base station may also configure the information field in real time according to the type of the preset time-domain resource configuration information that needs to be indicated, and then in the information field configured in real time, indicate the aforementioned preset time-domain resource configuration information; and before issuing the scheduling signaling, send the configuration information of the information field, such as the position, the size of the information field and the like, to the target UE; so as to enable the target UE to, before receiving the scheduling information, determine the configuration information of the foregoing information field, so that the target UE can quickly locate the preset information field and parse the time-domain range of the preceding downlink transmission resource from it, after receiving the scheduling signaling.

In block 1312, the indication information corresponding to the time-domain resource configuration information of the first-type is carried in the preset information field, and the scheduling instruction is generated.

In the present disclosure, according to the different types of time-domain resource configuration information that can be indicated in one scheduling signaling, the following at least two manners can be used to carry the aforementioned time-domain resource configuration information of the first-type in the information field of the scheduling signaling:

Manner 1: If one scheduling signaling indicates time-domain resource configuration information of one transmission resource type, the indication information of the time-domain resource configuration information of the first-type is carried in the information field of this scheduling signaling.

Exemplarily, assuming one bit at a preset position in the aforementioned scheduling signaling of the preset information field, such as the second bit, when this bit is set to 0, it represents that the scheduling signaling indicates the time-domain resource configuration information of the preceding downlink transmission resource, that is, the time-domain resource configuration information of the first-type.

Correspondingly, when the second bit is set to 1, it represents that the scheduling signaling indicates the time-domain resource configuration information of the following downlink transmission resource, that is, the time-domain resource configuration information of the second-type. In the above example, the correspondence between the values of the second bit and the types of the time-domain resource configuration information can be as shown in Table 1:

TABLE 1

| Types of preset time-domain resource configurations | Values of the second bit |
| --- | --- |
| Time-domain resource configuration information of the first-type | 0 |
| Time-domain resource configuration information of the second-type | 1 |

In the embodiment, the preset information field of the scheduling signaling, such as the second bit, is set to 1.

Manner 2: The aforementioned information field in the scheduling signaling can indicate two types of preset time-domain resource configuration information at the same time, and then the information field of the scheduling signaling carries at least the indication information of the aforementioned time-domain resource configuration information of the first-type.

Exemplarily, two bits may be used to indicate the types of time-domain resource configurations, wherein one bit is used to indicate whether the current scheduling signaling carries the aforementioned time-domain resource configuration information of the first-type. Assuming that the preset bit is the third bit in the scheduling signaling, when the bit is set to 0, it represents that the scheduling signaling does not carry the aforementioned time-domain resource configuration information of the first-type; and when the bit is set to 1, it represents that the current scheduling signaling carries the aforementioned time-domain resource configuration information of the first-type. Similarly, another preset bit in the scheduling signaling, such as the fourth bit, is used to indicate whether the current scheduling signaling carries the aforementioned time-domain resource configuration information of the second-type. Similarly, when the fourth bit is respectively set to 0 or 1, it represents that the current scheduling signaling does not carry or carries the aforementioned time-domain resource configuration information of the second-type. In this embodiment, the correspondence between the information fields and the indication information of the time-domain resource configuration information may be as shown in Table 2:

TABLE 2

| Position of information fields | Values of bit | Types of time-domain resource configurations |
|---|---|---|
| The third bit | 0 | None |
|  | 1 | Time-domain resource configuration information of the first-type |
| The fourth bit | 0 | None |
|  | 1 | Time-domain resource configuration information of the second-type |

That is, in an embodiment of the present disclosure, the preset information field of the scheduling signaling, such as the third bit, is set to 1.

It should be noted that the number of bits and values of the bits corresponding to the aforementioned information field are only illustrative of the correspondence between the information field and the indication information of the time-domain resource configuration information, and should not be construed as a limitation of the present disclosure. For example, in the above example, more bits may be used to carry the indication information of one type of time-domain resource configuration information. Or, when the bit is set to 0, it represents that the current scheduling signaling carries the aforementioned time-domain resource configuration information of a preset type. The aforementioned information on the information field is configurable.

For example, in an embodiment of the present disclosure, for the moment when the channel detection is successful, different positions in a preset transmission unit, such as one time slot, correspond to different preset time-domain resource configuration information. The system may appoint index information corresponding to the aforementioned different time-domain resource configuration information. Exemplarily, as shown in Table 3:

TABLE 3

| Position where the channel detection is successful | Time-domain resource configuration information of the first-type | Index information of time-domain resource configuration information of the first-type |
|---|---|---|
| Symbol 0 | Configuration information 0 | P10 |
| Symbol 1 | Configuration information 1 | P11 |
| Symbol 2 | Configuration information 2 | P12 |
| . . . | . . . | . . . |
| Symbol 13 | Configuration information 13 | P113 |

Table 3 shows the correspondence among different positions where the channel detection is successful, the time-domain resource configuration information of the first-type, and the index information of the time-domain resource configuration information of the first-type, which are appointed by the system. For example, the above configuration information 0 is used to indicate the time-domain range of the following transmission region when the base station succeeds in channel detection at a position of the 0th symbol of one time slot; for example, a time-domain resource range of a preset duration maintains starting from the 1st symbol, and the time-domain resource range may be represented by a preset index value P10. By analogy, P1X represents the corresponding first time-domain resource configuration information when the channel detection succeeds at a position of the Xth symbol of one time slot, where X represents the sequence number of the symbol in one slot, and the value range of X is an integer in 0~13.

For the foregoing embodiment, an information field occupying more bits may be set in the scheduling instruction to carry index information corresponding to different the time-domain resource configuration information of the first-type.

In the second case, the base station sets an information field in the scheduling signaling issued to the target UE, and the base station can carry the indication information corresponding to the time-domain resource configuration type in the above preset information field according to the time-domain resource configuration type to be indicated by the scheduling instruction to be issued, without sending the specific contents of the preset time-domain resource configuration information to the UE, and the time-domain resource configuration information of the preceding downlink transmission resource can be clearly indicated through the information field, which effectively saves signaling overhead.

In a third case, the system appoints a type of preset time-domain resource configuration information. In general, the preset time-domain resource configuration information is suitable for scheduling the following downlink transmission resource, that is, the aforementioned time-domain resource configuration information of the second-type. In an embodiment of the present disclosure, if the time-domain range of the aforementioned preceding downlink transmission resource is also determined according to the aforementioned time-domain resource configuration information of the second-type, the base station, by setting transmission characteristic information of the scheduling instruction, can implicitly inform the target UE of the following information: the base station has sent downlink data to the target UE by using the preceding downlink transmission resources, and can determine the time-domain range of the preceding downlink transmission resource according to the preset time-domain resource configuration information.

In block 14, the scheduling instruction is sent to the terminal, so that the terminal acquires the target information sent by the base station from the buffered data information according to the scheduling instruction.

Figure 4:
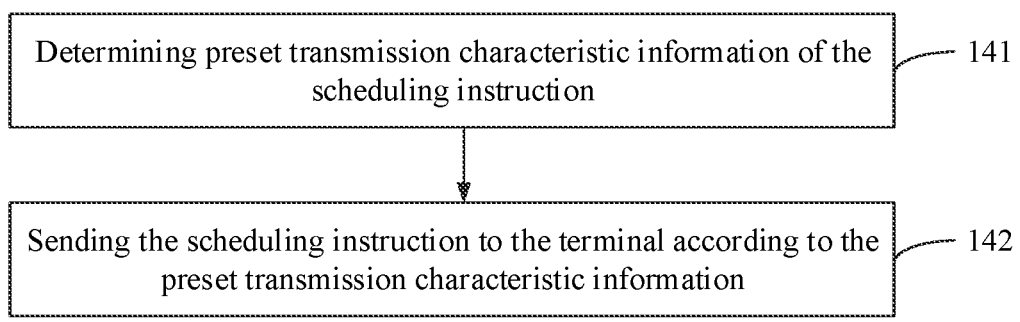
FIG. 4 is a flow chart of another method for transmitting information shown according to an exemplary embodiment of the present disclosure.

For the third case of the aforementioned step 13, referring to FIG. 4 showing a flowchart of another method for transmitting information according to an exemplary embodiment, the above step 14 may include:

In block 141, preset transmission characteristic information of the scheduling instruction is determined, the preset transmission characteristic information being used to indicate that the time-domain resource configuration information of the second-type is also applicable to the time-domain configuration of the preceding downlink transmission resource;

In the present disclosure, the aforementioned preset transmission characteristic information may include at least one of the following:

preset transmission position;
preset downlink control information DCI format;
preset radio network temporary identifier RNTI;
preset scrambling sequence.

In block 142, the scheduling instruction is sent to the terminal according to the preset transmission characteristic information.

Exemplarily, the DCI format for preset downlink control information will be exemplified for description. According to related knowledge, the DCI information configured by the base station for the target UE may include information in different formats. Generally, the aforementioned preset time-domain resource configuration information of the second-type should be issued to the target UE through a format 1 corresponding to the downlink configuration (DL Assignment) information. Assuming that the system appoints that, when the preset time-domain resource configuration information of the second-type is loaded in DCI information in a preset format such as format 3 for transmission, it represents that the preset time-domain resource configuration information of the second-type is applicable to the configuration of the preceding downlink transmission resource. And then the base station can issue the aforementioned scheduling instruction to the terminal through the format 3.

Figures 1, 5:
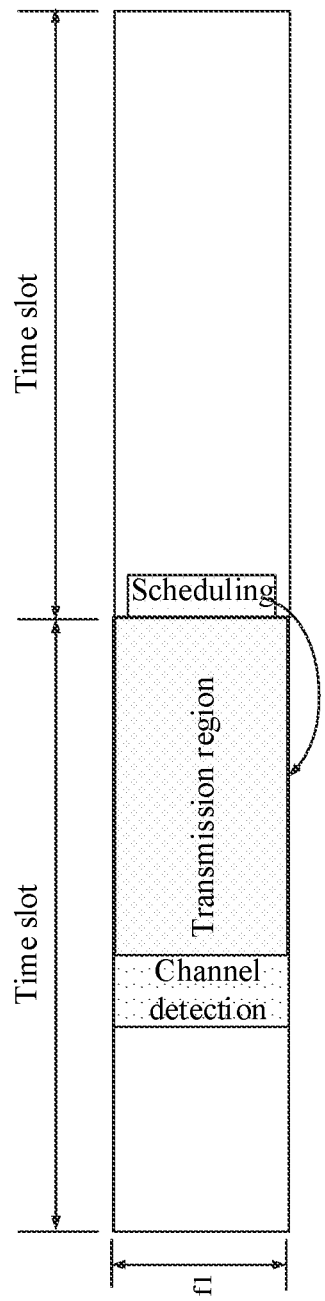

Referring to FIG. 5-1 showing a schematic diagram of an application scenario for transmitting information according to an exemplary embodiment, assuming that the base station succeeds in the channel detection at a certain time-domain position in a preset time transmission unit, such as one time slot, on the channel corresponding to a frequency range f1 of an unlicensed spectrum, the base station can directly perform downlink data transmission on the determined idle channel resource, that is, the transmission region, and after completing the downlink data transmission, such as on the first symbol of the next slot, issue, to the target UE, the scheduling instruction used to indicate the time-domain range of the transmission region.

In the present disclosure, the base station first performs downlink data transmission by using an unlicensed spectrum resource, and then sends a scheduling instruction used to indicate the configuration information of the preceding downlink transmission resource to the target UE, to ensure that the unlicensed spectrum resource indicated by the scheduling instruction is an effective resource capable of transmitting downlink data, thus no signaling overhead will be wasted due to the uncertainty of the channel occupancy of the unlicensed spectrum, and the reliability of the base station using the unlicensed spectrum resource to transmit information is also improved at the same time.

In another embodiment of the present disclosure, when performing the step 11, the base station may also send buffering indication information to the terminal before performing downlink data transmission by using an idle channel resource, the buffering indication information being used to indicate the time when the terminal starts to buffer the data information.

In an embodiment of the present disclosure, the base station may send the buffering indication information to the target UE at a preset time, for example, after successful channel detection, to indicate at which time the target UE starts to buffer the data information carried in the unlicensed spectrum. In another embodiment of the present disclosure, the aforementioned buffering indication information may further include: buffering duration information, that is, data used to indicate how long the UE buffers. Exemplarily, FIG. 5-2 is referred to showing a schematic diagram of another application scenario for transmitting information according to an exemplary embodiment. The difference from FIG. 5-1 is that: after determining that the channel detection is successful, the base station first sends the buffering indication information to the target UE, and then performs downlink data transmission on the idle channel resource, that is, the transmission region.

In an embodiment of the present disclosure, before sending the downlink data, the base station sends the buffering indication information to the target UE, which can prevent the UE from continuously buffering the data information transmitted in the unlicensed spectrum and wasting power consumption, thereby realizing the reduction of the amount of the buffered data and the saving of the power consumption of the UE. At the same time, the detection efficiency of the target information by the target UE can also be effectively improved.

In the present disclosure, the base station may use upper layer signaling or physical layer signaling to send the aforementioned scheduling instruction, information field configuration information, or buffering indication information to the target UE. Wherein the upper layer signaling may be RRC (Radio Resource Control) signaling, MAC (Medium Access Control) CE (Control Element) signaling.

Figure 6:
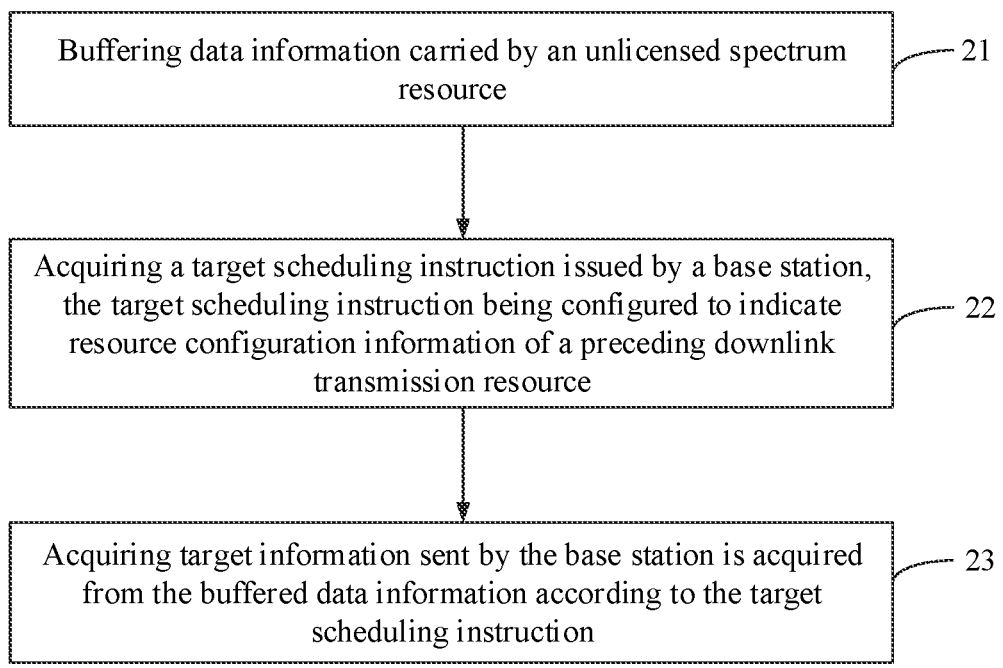
FIG. 6 is a flow chart of a method for transmitting information shown according to an exemplary embodiment of the present disclosure.

Correspondingly, the present disclosure provides a method for transmitting information, which can be applied to a terminal. Referring to FIG. 6 showing a flowchart of a method for transmitting information according to an exemplary embodiment, the method may include the following steps:

In block 21, data information carried by an unlicensed spectrum resource is buffered;

In the present disclosure, in order to acquire the target information issued by the base station through the unlicensed spectrum without receiving the scheduling instruction in advance, the UE may first buffer data information that may carry the aforementioned target information according to a preset strategy.

In the present disclosure, the UE can buffer the data transmitted by the detected unlicensed spectrum resource, in accordance with the buffering indication information, according to the capability to receive information, of its own radio frequency devices for the unlicensed spectrum, such as antennas working in 2.4 GHz, 5 GHz and other high frequency bands. Wherein the UE buffering the data information may include the following two cases:

Case 1: The UE periodically buffers the data carried by the unlicensed spectrum in accordance with the preset buffering indication information appointed by the system.

Wherein the aforementioned preset buffering indication information may include: buffering period duration, and may also include information such as buffering trigger timing. Wherein the aforementioned buffering period duration is used to indicate in which length of time the UE completes data buffering once. The aforementioned buffering trigger timing may be the timing when the UE accesses the cell network covered by the base station, or other preset timing for triggering the buffering.

Figures 1, 7:
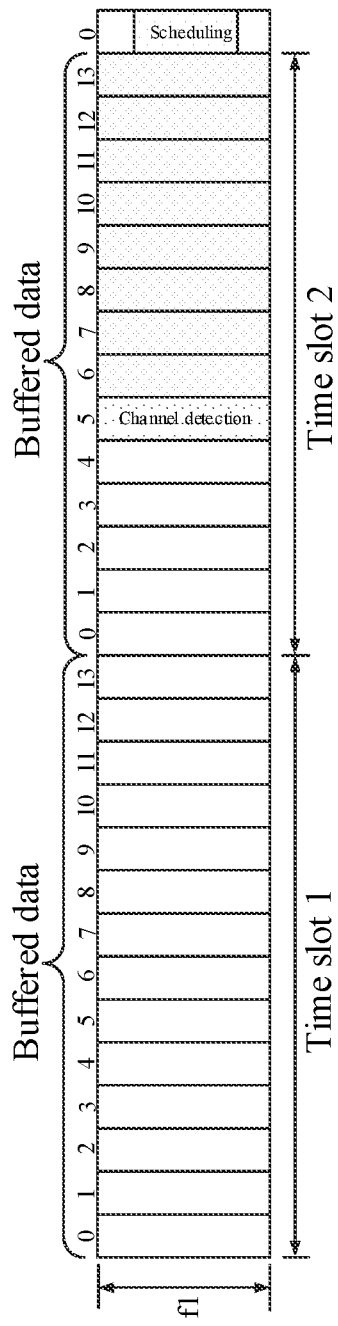
Figures 2, 7:
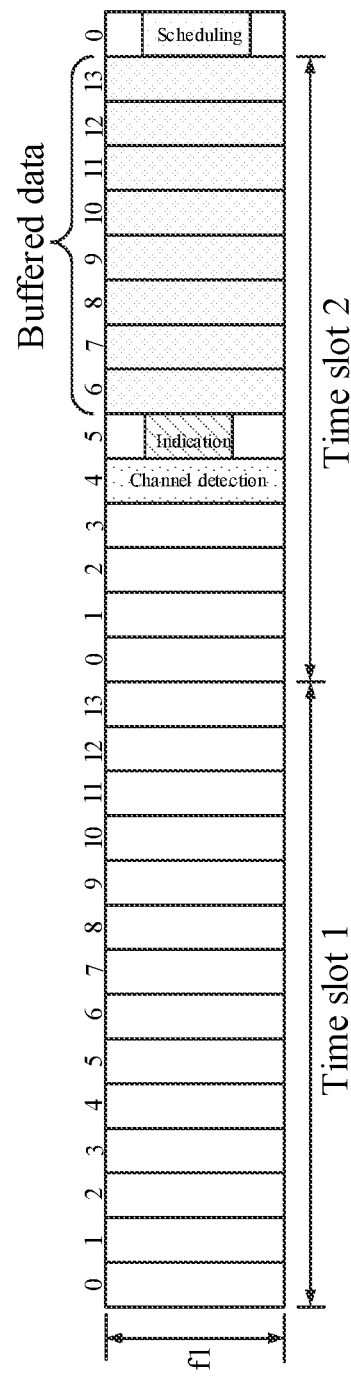

Referring to FIG. 7-1 showing a schematic diagram of another scenario for transmitting information according to an exemplary embodiment, assuming that the current terminal is UE1, and the above figure shows an example, in which the UE1, according to its own support capability for radio frequency on an unlicensed spectrum, buffers data in one channel of the unlicensed spectrum of a frequency range of f1. As shown in the figure, the UE1 can continuously buffer the data information transmitted by unlicensed spectrum resource in accordance with the preset buffering period appointed by the system, that is, one time slot; in this example, one slot includes 14 symbols.

Case 2: The UE may buffer the data information carried by the unlicensed spectrum resource according to the buffering indication information issued by the base station.

This case corresponds to the embodiment in which the base station issues the buffering indication information. In an embodiment of the present disclosure, according to the different contents of the buffering indication information, the UE can use the following two manners for data buffering:

Manner 1: When receiving the buffering indication information issued by the base station, the buffering of the data information carried by the unlicensed spectrum resource is started.

Exemplarily, the aforementioned buffering indication information may be preset pilot information, and the system appoints that, when the preset pilot information appears, the UE can be instructed to start the buffering of the data information of the unlicensed spectrum.

Manner 2: The buffering indication information issued by the base station includes: indication information of a buffering start time.

Figure 8:
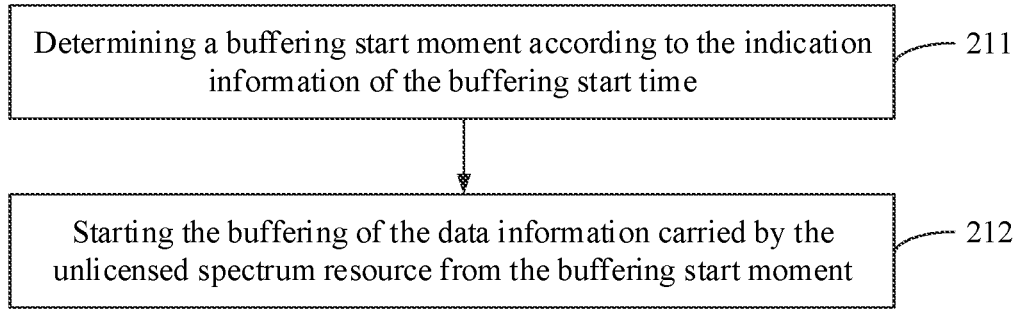
FIG. 8 is a flow chart of another method for transmitting information shown according to an exemplary embodiment of the present disclosure.

Correspondingly, referring to FIG. 8 showing a flowchart of another method for transmitting information according to an exemplary embodiment, the aforementioned step 21 may include:

In block 211, a buffering start moment is determined according to the indication information of the buffering start time;

In block 212, the buffering of the data information carried by the unlicensed spectrum resource is started from the buffering start moment.

In an embodiment of the present disclosure, the buffering indication information issued by the base station may include: indication information of an initial buffering moment. The indication information of the initial buffering moment is used to instruct the UE to start buffering data at a certain following moment, for example, at which symbol of one slot. In an embodiment of the present disclosure, the initial buffering moment may be the same as the moment at which the base station starts to transmit downlink data, thereby improving the accuracy of the buffering of effective data information by the UE. In another embodiment of the present disclosure, the aforementioned buffering indication information may further include: buffering duration information; the buffering duration information is used to indicate how long the UE buffers data each time.

Exemplarily, referring to FIG. 7-2 showing a schematic diagram of another scenario for transmitting information according to an exemplary embodiment, assuming that the UE1 is at the position of the symbol with the sequence number 5 in the time slot 2, and receives the buffering indication information issued by the base station, and the base station starts to transmit downlink data at the position of the symbol with the sequence number 6 in the time slot 2. The aforementioned buffering indication information can instruct the UE1 to start the buffering the data information from the position of the symbol with the sequence number 6, so that the UE1 can buffer the downlink data sent by the base station from the beginning, thereby effectively improving the detection efficiency of target information.

In block 22, a target scheduling instruction issued by a base station is acquired, the target scheduling instruction being used to indicate resource configuration information of a preceding downlink transmission resource, and the preceding downlink transmission resource referring to the unlicensed spectrum resource that has completed transmission for downlink data before the base station issues scheduling information on the resource;

In view of the fact that the UE may receive many scheduling instructions within a period of time, for example, in an application scenario where both a licensed spectrum resource and an unlicensed spectrum resource are used at the same time to transmit different types of services between the base station and the UE, the UE may receive two or more scheduling instructions at the same time. The UE needs to identify the target scheduling instruction used to indicate the preceding downlink transmission resource from the received scheduling instructions.

Figure 9:
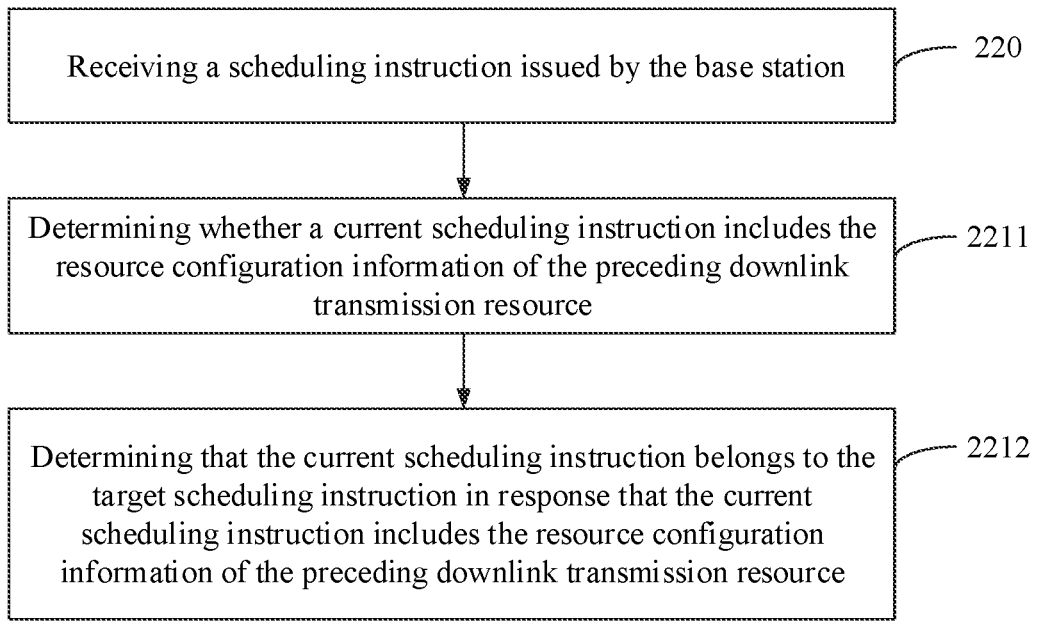
FIG. 9 is a flow chart of a method for transmitting information shown according to an exemplary embodiment of the present disclosure.

Corresponding to the manners in which the base station determines the scheduling instruction, in the present disclosure, the UE may determine whether the received scheduling instruction belongs to the aforementioned target scheduling instruction according to at least one of the following manners:

Manner 1: Determine the target scheduling signaling according to the time-frequency information included in the received scheduling instruction;

Referring to FIG. 9 showing a flowchart of another method for transmitting information according to an exemplary embodiment, the aforementioned step 22 may include:

In block 220, a scheduling instruction issued by the base station is received;

In block 2211, it is determined whether a current scheduling instruction includes the resource configuration information of the preceding downlink transmission resource;

In block 2212, it is determined that the current scheduling instruction belongs to the target scheduling instruction if the current scheduling instruction includes the resource configuration information of the preceding downlink transmission resource.

In an embodiment of the present disclosure, the UE may determine specific time-frequency range information according to the resource configuration information included in the current scheduling instruction; and if the time-frequency range information includes the time-domain range of the scheduled resource, it is determined that the current scheduling instruction belongs to the target scheduling instructions. Wherein the time-domain range of the scheduled resource is earlier than the current time.

For example, the time-domain information indicated by the current scheduling instruction is: (T1~T2), and the current moment is T0. If T1 is less than T0, it is indicated that the current scheduling instruction includes: the time-domain information of the scheduled resource.

Figure 10:
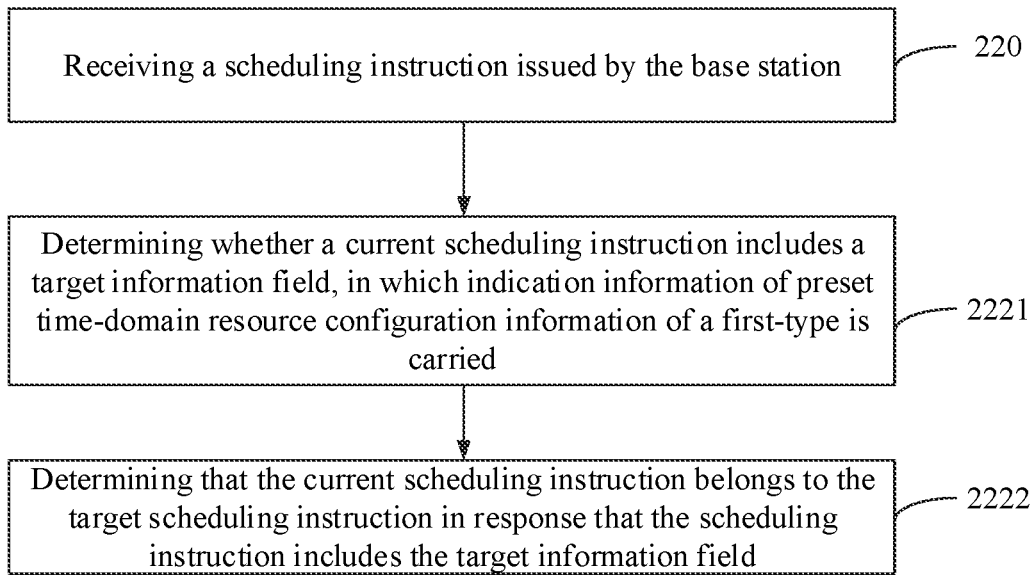
FIG. 10 is a flow chart of another method for transmitting information shown according to an exemplary embodiment of the present disclosure.

Manner 2: Determine the aforementioned target scheduling signaling according to whether the received scheduling instruction includes a preset information field;

Referring to FIG. 10 showing a flowchart of another method for transmitting information according to an exemplary embodiment, the aforementioned step 22 may include:

In block 220, a scheduling instruction issued by the base station is received;

In block 2221, it is determined whether a current scheduling instruction includes a target information field, in which indication information of preset time-domain resource configuration information of a first-type is carried, the preset time-domain resource configuration information of the first-type being time-domain resource configuration information at the time when the base station schedules the preceding downlink transmission resource, which is appointed by the system;

In block 2222, it is determined that the current scheduling instruction belongs to the target scheduling instruction if the scheduling instruction includes the target information field.

In an embodiment of the present disclosure, each time the UE receives a scheduling signaling, it can determine whether the scheduling signaling carries an information field with a preset value, that is, a target information field. Exemplarily, corresponding to the above Table 1, it may be determined whether the value of the second bit of the current scheduling signaling is 0, and if so, it is determined that the current scheduling instruction belongs to the target scheduling instruction.

Figure 11:
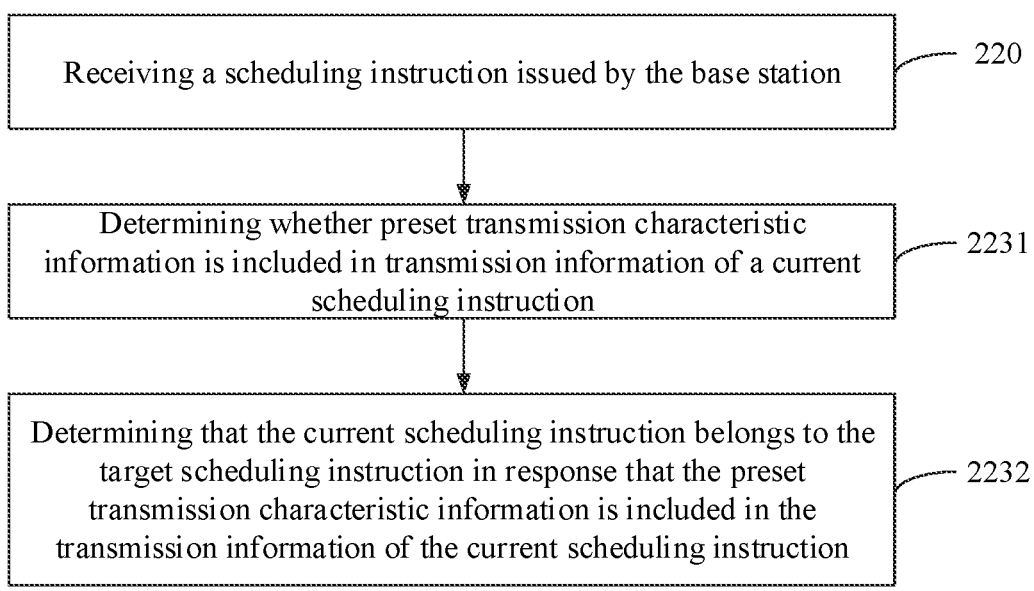
FIG. 11 is a flow chart of another method for transmitting information shown according to an exemplary embodiment of the present disclosure.

Manner 3: Determine the aforementioned target scheduling signaling according to whether the transmission information of the current scheduling instruction includes preset transmission characteristic information;

Referring to FIG. 11 showing a flowchart of another method for transmitting information according to an exemplary embodiment, the aforementioned step 22 may include:

In block 220, a scheduling instruction issued by the base station is received;

In block 2231, it is determined whether preset transmission characteristic information is included in transmission information of a current scheduling instruction, the preset transmission characteristic information being used to indicate that the current scheduling instruction includes time-domain resource configuration information of the preceding downlink transmission resource;

In block 2232, it is determined that the current scheduling instruction belongs to the target scheduling instruction if the preset transmission characteristic information is included in the transmission information of the current scheduling instruction.

Wherein the aforementioned preset transmission characteristic information includes at least one of the following:
preset transmission location;
preset downlink control information DCI format;
preset radio network temporary identifier RNTI;
preset scrambling sequence.

Corresponding to the aforementioned example on the base station side, if the UE acquires the current scheduling instruction in the DCI information in the format 3, it can be determined that the current scheduling instruction belongs to the aforementioned target scheduling instruction.

In block 23, target information sent by the base station is acquired from the buffered data information according to the target scheduling instruction.

Figure 12:
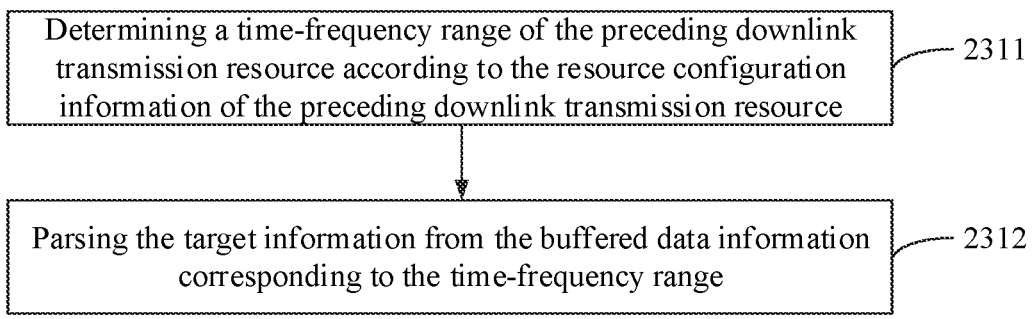
FIG. 12 is a flow chart of a method for transmitting information shown according to an exemplary embodiment of the present disclosure.

Corresponding to the three manners of the aforementioned step 22 above, this step 23 may also include three implementation manners:

In a first manner, corresponding to the manner 1 of the step 22, referring to FIG. 12 showing a flowchart of another method for transmitting information according to an exemplary embodiment, the aforementioned step 23 may include:

In block 2311, a time-frequency range of the preceding downlink transmission resource is determined according to the resource configuration information of the preceding downlink transmission resource;

In block 2312, the target information is parsed from the buffered data information corresponding to the time-frequency range.

In an embodiment of the present disclosure, the UE can determine the time-frequency range of the preceding downlink transmission resource, such as (T1~T0, f1), according to the resource configuration information included in the target scheduling signaling, so as to parse the target information from the buffered data information corresponding to the resource of the time-frequency range.

In a second manner, corresponding to the manner 2 of the step 22, the aforementioned target scheduling instruction includes at least: the aforementioned target information field, and the indication information of the aforementioned preset time-domain resource configuration information of the first-type is carried in the target information field.

Figure 13:
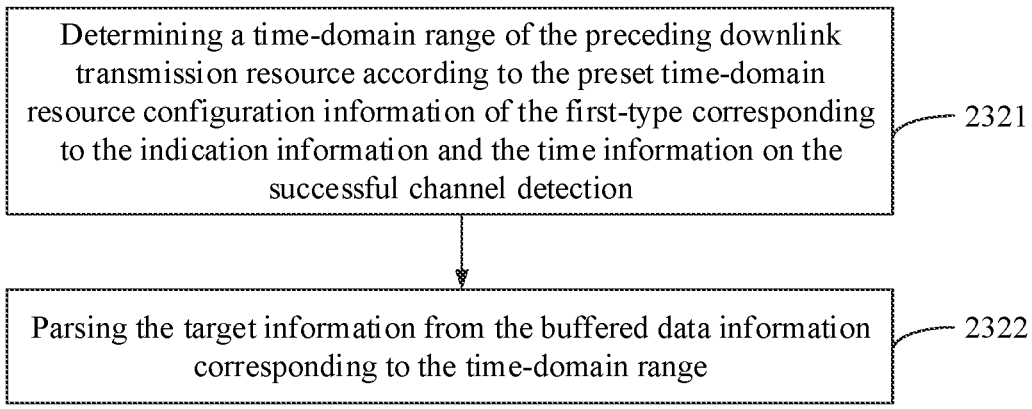
FIG. 13 is a flow chart of another method for transmitting information shown according to an exemplary embodiment of the present disclosure.

Referring to FIG. 13 showing a flowchart of another method for transmitting information according to an exemplary embodiment, the aforementioned step 23 may include:

In block 2321, a time-domain range of the preceding downlink transmission resource is determined according to the preset time-domain resource configuration information of the first-type corresponding to the indication information;

The aforementioned indication information means that, it is indicated that the scheduling instruction carries the preset time-domain resource configuration information of the first-type, which may be 0 in the above table 1, or may also be any index information in the above table 3, such as P15, the P15 represents the corresponding time-domain resource configuration information of the first-type when the position where the channel detection is successful is at a symbol with the sequence number of 5 of one slot, the corresponding first-type time-domain resource configuration information, for example, the following 8 symbols being used to transmit downlink information.

In block 2322, the target information is parsed from the buffered data information corresponding to the time-domain range.

Exemplarily, assuming that the system appoints that, the aforementioned time-domain resource configuration information of the first-type is: the information is transmitted within a window after successful channel detection and with a preset time duration, for example, 8 symbols. Corresponding to the aforementioned embodiment shown in FIG. 7-1, if the time information for the aforementioned successful channel detection is the symbol with the sequence number 5 in the time slot 2, then according to the aforementioned preset time-domain resource configuration information P15 of the first-type, the UE can determine that the time-domain range, where the target information is located, is the time range in the time slot 2 corresponding to the symbols with the sequence numbers of 6-13, so that the target information issued by the base station is parsed from the data information buffered in this time range.

Figure 14:
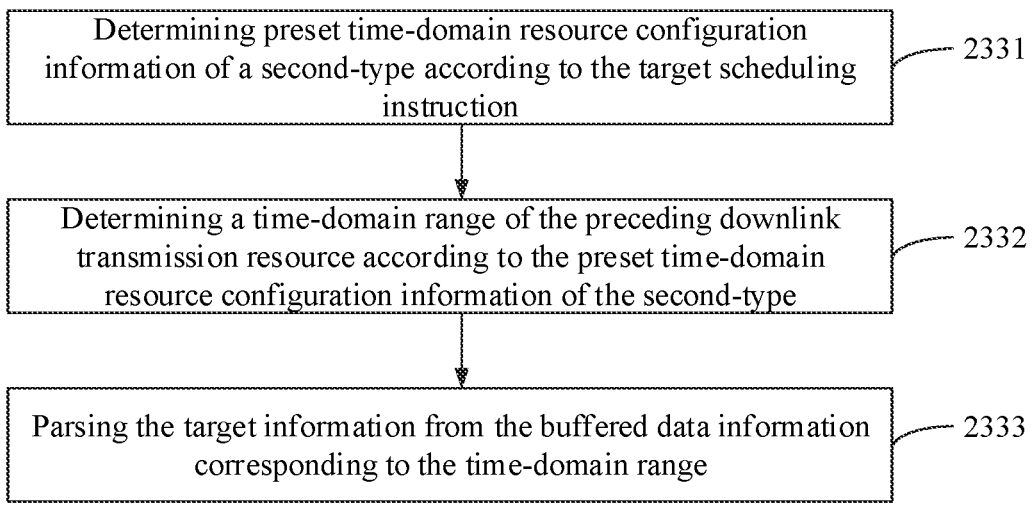
FIG. 14 is a flow chart of another method for transmitting information shown according to an exemplary embodiment of the present disclosure.

In a third manner, corresponding to the manner 3 of the step 22, referring to FIG. 14 showing a flowchart of another method for transmitting information according to an exemplary embodiment, the aforementioned step 23 may include:

In block 2331, preset time-domain resource configuration information of a second-type is determined according to the target scheduling instruction, the preset time-domain resource configuration information of the second-type being time-domain resource configuration information at the time when the base station schedules a following downlink transmission resource, which is appointed by the system;

In block 2332, a time-domain range of the preceding downlink transmission resource is determined according to the preset time-domain resource configuration information of the second-type;

In block 2333, the target information is parsed from the buffered data information corresponding to the time-domain range.

In the present disclosure, the terminal may first buffer the data information carried by the unlicensed spectrum resource, and then determine the time-domain resource range, where the target information is located, after detecting the target scheduling signaling for the preceding downlink transmission resource. Finally, the target information is parsed from the buffered data information corresponding to the time-domain range, which can effectively improve the reliability of the transmission information by using the unlicensed spectrum resource.

For the foregoing respective method embodiments, for the sake of simple description, they are all expressed as a series of action combinations, but those skilled in the art should know that the present disclosure is not limited by the described sequence of actions, because depending on the present disclosure, certain steps can be performed in other order or simultaneously.

Secondly, those skilled in the art should also know that the embodiments described in the specification all are optional embodiments, and actions and modules involved are not necessarily required by the present disclosure.

Corresponding to the foregoing method embodiments for realizing application functions, the present disclosure also provides embodiments of devices and corresponding terminals for realizing application functions.

Figure 15:
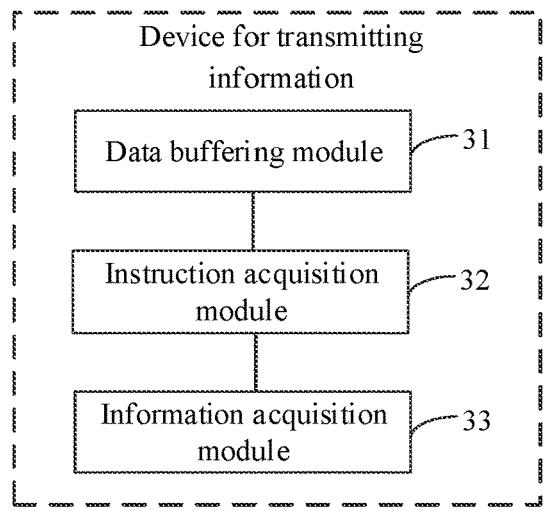
FIG. 15 is a block diagram of a device for transmitting information shown according to an exemplary embodiment of the present disclosure.

Referring to FIG. 15 showing a block diagram of a device for transmitting information according to an exemplary embodiment, which is provided in a terminal, the device may include:
- a data buffering module 31 configured to buffer data information carried by an unlicensed spectrum resource;
- an instruction acquisition module 32 configured to acquire a target scheduling instruction issued by a base station, the target scheduling instruction being used to indicate resource configuration information of a preceding downlink transmission resource, and the preceding downlink transmission resource referring to the unlicensed spectrum resource that has completed transmission for downlink data before the base station issues scheduling information on the resource;
- an information acquisition module 33 configured to acquire target information sent by the base station from the buffered data information according to the target scheduling instruction.

Figure 16:
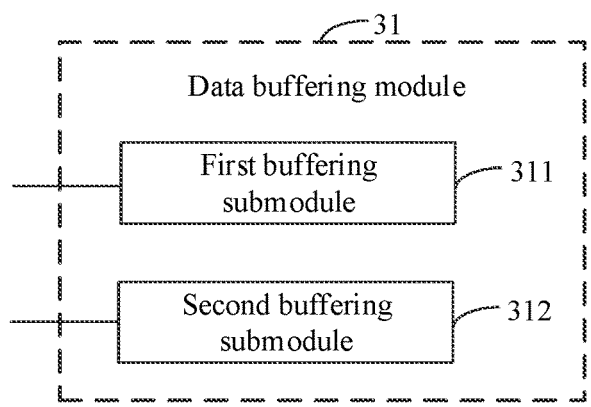
FIG. 16 is a block diagram of another device for transmitting information shown according to an exemplary embodiment of the present disclosure.

Referring to FIG. 16 showing a block diagram of another device for transmitting information according to an exemplary embodiment, on the basis of the embodiment of the device shown in FIG. 15, the data buffering module 31 may include:
- a first buffering submodule 311 configured to buffer the data information carried by the unlicensed spectrum resource in accordance with preset buffering indication information; or,
- a second buffering submodule 312 configured to buffer the data information carried by the unlicensed spectrum resource according to the buffering indication information issued by the base station.

Figure 17:
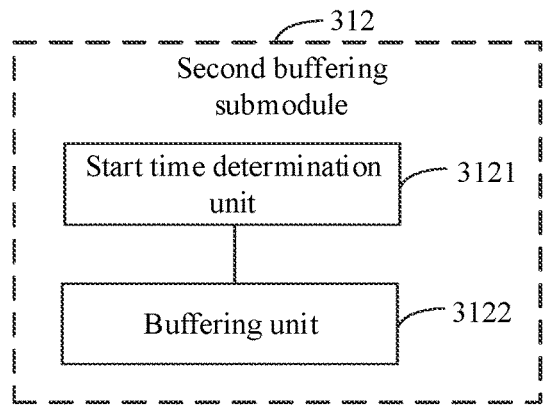
FIG. 17 is a block diagram of another device for transmitting information shown according to an exemplary embodiment of the present disclosure.

In a device embodiment of the present disclosure, the buffering indication information at least includes: indication information of a buffering start time; correspondingly, referring to FIG. 17 showing a block diagram of another device for transmitting information according to an exemplary embodiment, on the basis of the embodiment of the device shown in FIG. 16, the second buffering submodule 312 may include:
- a start time determination unit 3121 configured to determine a buffering start moment according to the indication information of the buffering start time;
- a buffering unit 3122 configured to start the buffering of the data information carried by the unlicensed spectrum resource from the buffering start moment.

Figure 18:
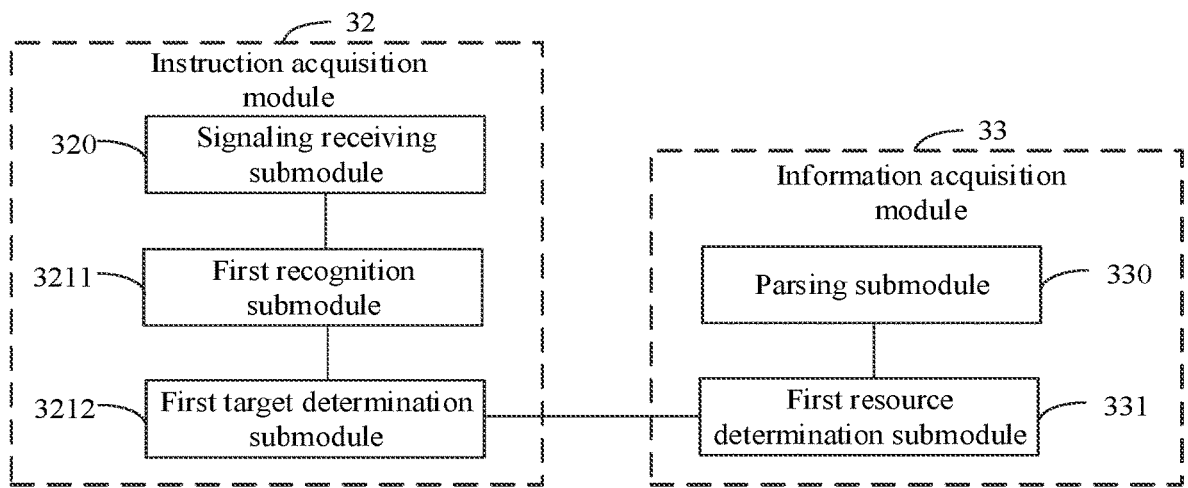
FIG. 18 is a block diagram of another device for transmitting information shown according to an exemplary embodiment of the present disclosure.

Referring to FIG. 18 showing a block diagram of another device for transmitting information according to an exemplary embodiment, on the basis of the embodiment of the device shown in FIG. 15, the instruction acquisition module 32 may include:
- a signaling receiving submodule 320 configured to receive a scheduling instruction issued by the base station;
- a first recognition submodule 3211 configured to determine whether a current scheduling instruction includes the resource configuration information of the preceding downlink transmission resource;
- a first target determination submodule 3212 configured to determine that the current scheduling instruction belongs to the target scheduling instruction in the event that the current scheduling instruction includes the resource configuration information of the preceding downlink transmission resource.

The information acquisition module 33 may include:
- a first resource determination submodule 331 configured to determine a time-frequency range of the preceding downlink transmission resource according to the resource configuration information of the preceding downlink transmission resource;
- a parsing submodule 330 configured to parse the target information from the buffered data information corresponding to the time-frequency range.

Figure 19:
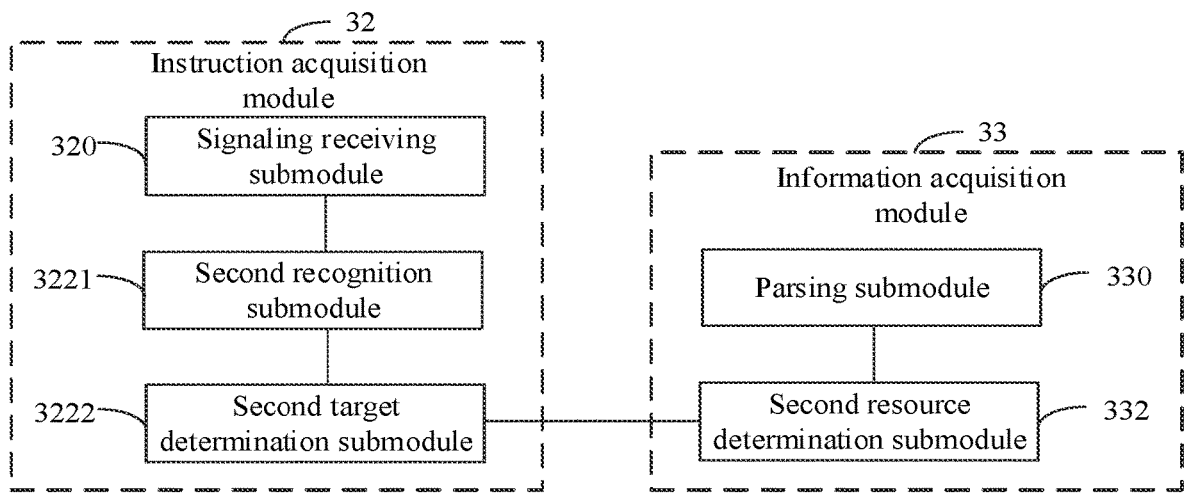
FIG. 19 is a block diagram of another device for transmitting information shown according to an exemplary embodiment of the present disclosure.

Referring to FIG. 19 showing a block diagram of another device for transmitting information according to an exemplary embodiment, on the basis of the embodiment of the device shown in FIG. 15, the instruction acquisition module 32 may include:
- a signaling receiving submodule 320 configured to receive a scheduling instruction issued by the base station;
- a second recognition submodule 3221 configured to determine whether a current scheduling instruction includes a target information field, in which indication information of preset time-domain resource configuration information of a first-type is carried, the preset time-domain resource configuration information of the first-type being time-domain resource configuration information at the time when the base station schedules the preceding downlink transmission resource, which is appointed by the system;
- a second target determination submodule 3222 configured to determine that the current scheduling instruction belongs to the target scheduling instruction in the event that the scheduling instruction includes the target information field.

Correspondingly, the information acquisition module 33 may include:
- a second resource determination submodule 332 configured to determine a time-domain range of the preceding downlink transmission resource according to the preset time-domain resource configuration information of the first-type corresponding to the indication information;
- a parsing submodule 330 configured to parse the target information from the buffered data information corresponding to the time-domain range.

Figure 20:
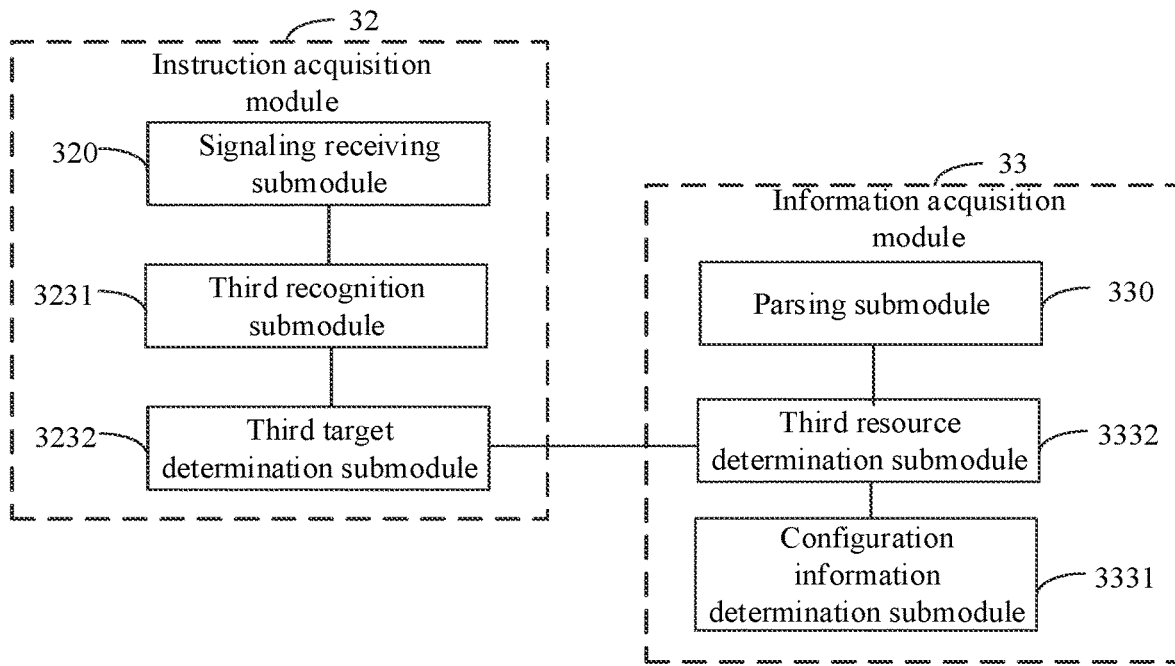
FIG. 20 is a block diagram of another device for transmitting information shown according to an exemplary embodiment of the present disclosure.

Referring to FIG. 20 showing a block diagram of another device for transmitting information according to an exemplary embodiment, on the basis of the embodiment of the device shown in FIG. 15, the instruction acquisition module 32 may include:

- a signaling receiving submodule 320 configured to receive a scheduling instruction issued by the base station;
- a third recognition submodule 3231 configured to determine whether preset transmission characteristic information is included in transmission information of a current scheduling instruction, the preset transmission characteristic information being used to indicate that the current scheduling instruction includes time-domain resource configuration information of the preceding downlink transmission resource;
- the preset transmission characteristic information includes at least one of the following:
- preset transmission location;
- preset downlink control information DCI format;
- preset radio network temporary identifier RNTI;
- preset scrambling sequence.
- a third target determination submodule 3232 configured to determine that the current scheduling instruction belongs to the target scheduling instruction in the event that the preset transmission characteristic information is included in the transmission information of the current scheduling instruction.

Correspondingly, the information acquisition module 33 may include:

- a configuration information determination submodule 3331 configured to determine preset time-domain resource configuration information of a second-type according to the target scheduling instruction, the preset time-domain resource configuration information of the second-type being time-domain resource configuration information at the time when the base station schedules a following downlink transmission resource, which is appointed by the system;
- a third resource determination submodule 3332 configured to determine a time-domain range of the preceding downlink transmission resource according to the preset time-domain resource configuration information of the second-type;
- a parsing submodule 330 configured to parse the target information from the buffered data information corresponding to the time-domain range.

Figure 21:
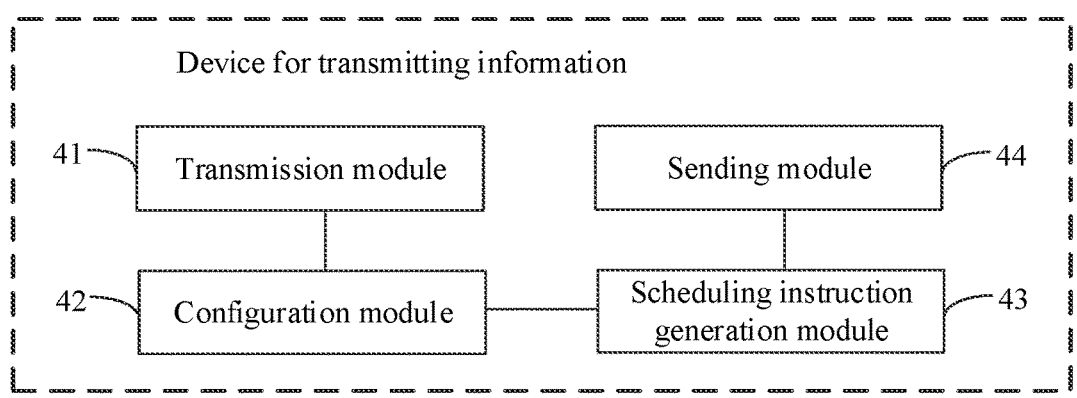
FIG. 21 is a block diagram of another device for transmitting information shown according to an exemplary embodiment of the present disclosure.

Correspondingly, the present disclosure also provides a device for transmitting information, which is provided in a base station, and referring to FIG. 21 showing a block diagram of a device for transmitting information according to an exemplary embodiment, the device may include:

- a transmission module 41 configured to perform a downlink data transmission by using an idle channel resource after a successful channel detection of an unlicensed spectrum resource;
- a configuration module 42 configured to determine resource configuration information corresponding to a preceding downlink transmission resource used to carry the downlink data transmission, the resource configuration information at least including: time-domain resource configuration information;
- a scheduling instruction generation module 43 configured to determine a scheduling instruction for the preceding downlink transmission resource according to the resource configuration information;
- a sending module 44 configured to send the scheduling instruction to a terminal, so as to enable the terminal to acquire target information sent by the base station from buffered data information according to the scheduling instruction.

Figure 22:
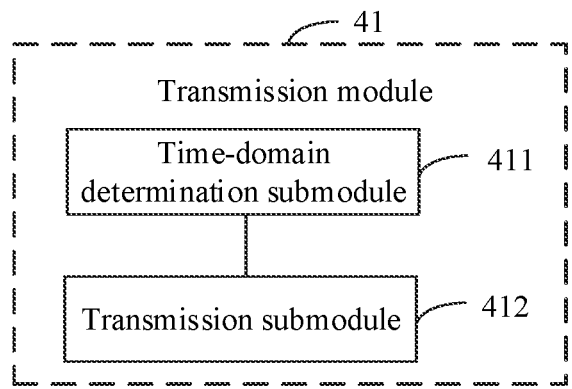
FIG. 22 is a block diagram of another device for transmitting information shown according to an exemplary embodiment of the present disclosure.

Referring to FIG. 22 showing a block diagram of another device for transmitting information according to an exemplary embodiment, on the basis of the embodiment of the device shown in FIG. 21, the transmission module 41 may include:

- a time-domain determination submodule 411 configured to determine a time-domain range of a transmission region, the transmission region being a region corresponding to a resource available to an unlicensed spectrum;
- a transmission submodule 412 configured to perform the downlink data transmission by using the unlicensed spectrum resource corresponding to the time-domain range.

Figure 23:
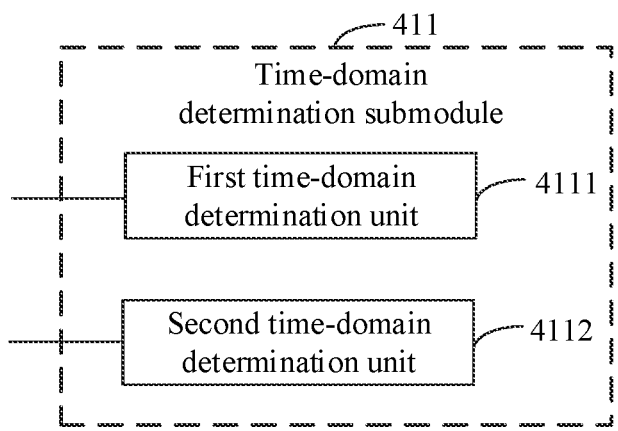
FIG. 23 is a block diagram of another device for transmitting information shown according to an exemplary embodiment of the present disclosure.

Referring to FIG. 23 showing a block diagram of another device for transmitting information according to an exemplary embodiment, on the basis of the embodiment of the device shown in FIG. 22, the time-domain determination submodule 411 may include:

- a first time-domain determination unit 4111 configured to determine the time-domain range of the transmission region in accordance with preset time-domain resource configuration information; or,
- a second time-domain determination unit 4112 configured to determine the time-domain range of the transmission region in real time according to data volume of downlink data to be transmitted.

In a device embodiment of the present disclosure, the preset time-domain resource configuration information is time-domain resource configuration information of a first-type at the time when scheduling the preceding downlink transmission resource, which is appointed by the system.

Figure 24:
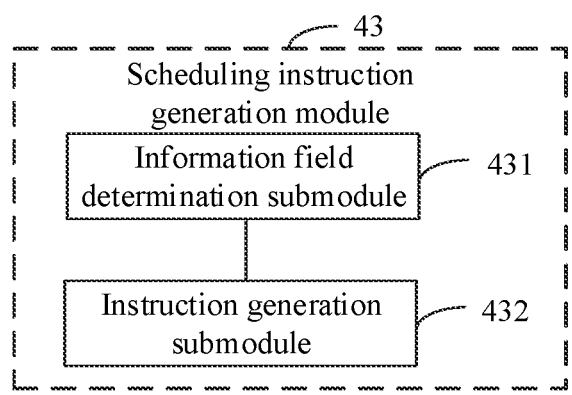
FIG. 24 is a block diagram of another device for transmitting information shown according to an exemplary embodiment of the present disclosure.

Correspondingly, referring to FIG. 24 showing a block diagram of another device for transmitting information according to an exemplary embodiment, on the basis of the embodiment of the device shown in FIG. 23, the scheduling instruction generation module 43 may include:

- an information field determination submodule 431 configured to determine an information field used to indicate the preset time-domain resource configuration information;
- an instruction generation submodule 432 configured to carry indication information corresponding to the time-domain resource configuration information of the first-type in the information field, and generating the scheduling instruction.

Figure 25:
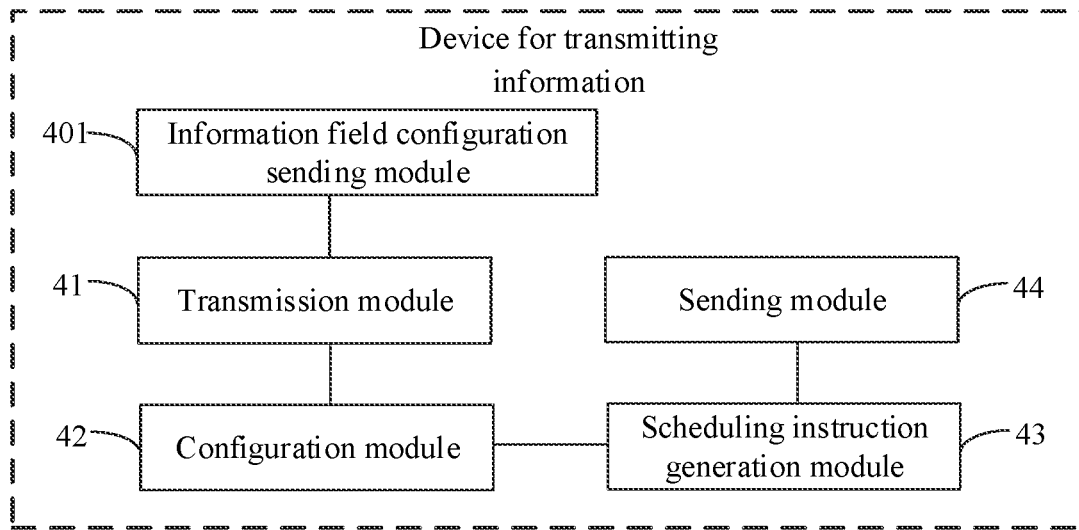
FIG. 25 is a block diagram of another device for transmitting information shown according to an exemplary embodiment of the present disclosure.

In another device embodiment of the present disclosure, the information field determination submodule 421 may be configured to configure location of the information field in a scheduling signaling and size of the information field to obtain configuration information of the information field;

Referring to FIG. 25 showing a block diagram of another device for transmitting information according to an exemplary embodiment, on the basis of the embodiment of the device shown in FIG. 24, the device may further include:

- an information field configuration sending module 40 configured to send the configuration information of the information field to the terminal.

Figure 26:
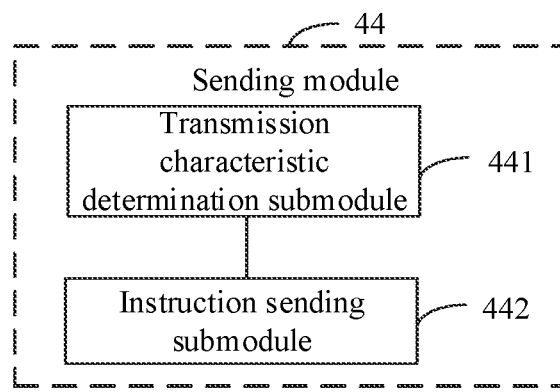
FIG. 26 is a block diagram of another device for transmitting information shown according to an exemplary embodiment of the present disclosure.
Figure 27:
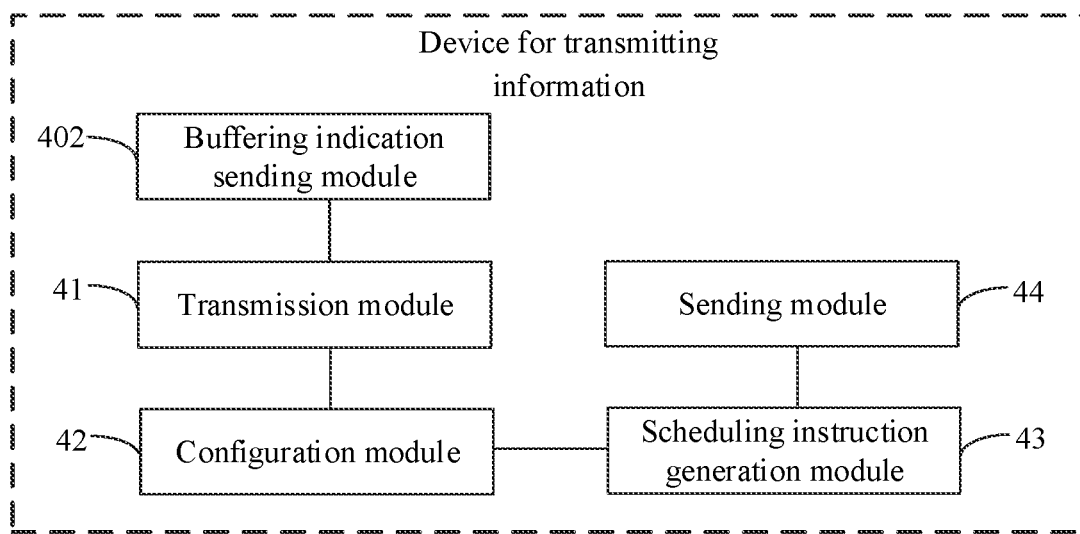
FIG. 27 is a block diagram of another device for transmitting information shown according to an exemplary embodiment of the present disclosure.

In another device embodiment of the present disclosure, the preset time-domain resource configuration information is time-domain resource configuration information of a second-type for scheduling a following downlink transmission resource, which is appointed by the system;

the scheduling instruction generation module 42 may be configured to determine the time-domain resource configuration information of the second-type as the resource configuration information of the preceding downlink transmission resource, and generating the scheduling instruction;

Correspondingly, referring to FIG. 26 showing a block diagram of another device for transmitting information according to an exemplary embodiment, on the basis of the embodiment of the device shown in FIG. 23, the sending module 44 may include:

a transmission characteristic determination submodule 441 configured to determine preset transmission characteristic information of the scheduling instruction, the preset transmission characteristic information being used to indicate that the time-domain resource configuration information of the second-type is also applicable to time-domain configuration of the preceding downlink transmission resource;

In a device embodiment of the present disclosure, the transmission characteristic information of the scheduling instruction may include at least one of the following:
preset transmission location;
preset downlink control information DCI format;
preset radio network temporary identifier RNTI;
preset scrambling sequence.

an instruction sending submodule 442 configured to send the scheduling instruction to the terminal in accordance with the preset transmission characteristic information.

referring to FIG. 27 showing a block diagram of another device for transmitting information according to an exemplary embodiment, on the basis of the embodiment of the device shown in FIG. 21, the device further includes:

a buffering indication sending module 402 configured to send buffering indication information to the terminal, the buffering indication information being used to indicate the time when the terminal starts to buffer data.

As for the device embodiments, since they basically correspond to the method embodiments, please refer to the part of the description of the method embodiments for related parts. The device embodiments described above are merely illustrative, in which the units described above as separate components may or may not be physically separated, and components displayed as units may or may not be physical units, that is, they may be located in one position, or may also be distributed to multiple network units. Some or all of the modules can be selected according to actual needs to achieve the objectives of the solutions of the present disclosure. Those of ordinary skill in the art can understand and implement without creative work.

Correspondingly, on the one hand, a terminal is provided, which includes:
a processor;
a memory for storing instructions executable by the processor;
wherein the processor is configured to:
buffer data information carried by an unlicensed spectrum resource;
acquire a target scheduling instruction issued by a base station, the target scheduling instruction being used to indicate resource configuration information of a preceding downlink transmission resource, and the preceding downlink transmission resource referring to the unlicensed spectrum resource that has completed transmission for downlink data before the base station issues scheduling information on the resource;
acquire target information sent by the base station from the buffered data information according to the target scheduling instruction.

On the other hand, a base station is provided, which includes:
a processor;
a memory for storing instructions executable by the processor;
wherein the processor is configured to:
perform a downlink data transmission by using an idle channel resource after a successful channel detection of an unlicensed spectrum resource;
determine resource configuration information corresponding to a preceding downlink transmission resource used to carry the downlink data transmission, the resource configuration information at least including: time-domain resource configuration information;
determine a scheduling instruction for the preceding downlink transmission resource according to the resource configuration information;
send the scheduling instruction to a terminal, so as to enable the terminal to acquire target information sent by the base station from buffered data information according to the scheduling instruction.

Figure 28:
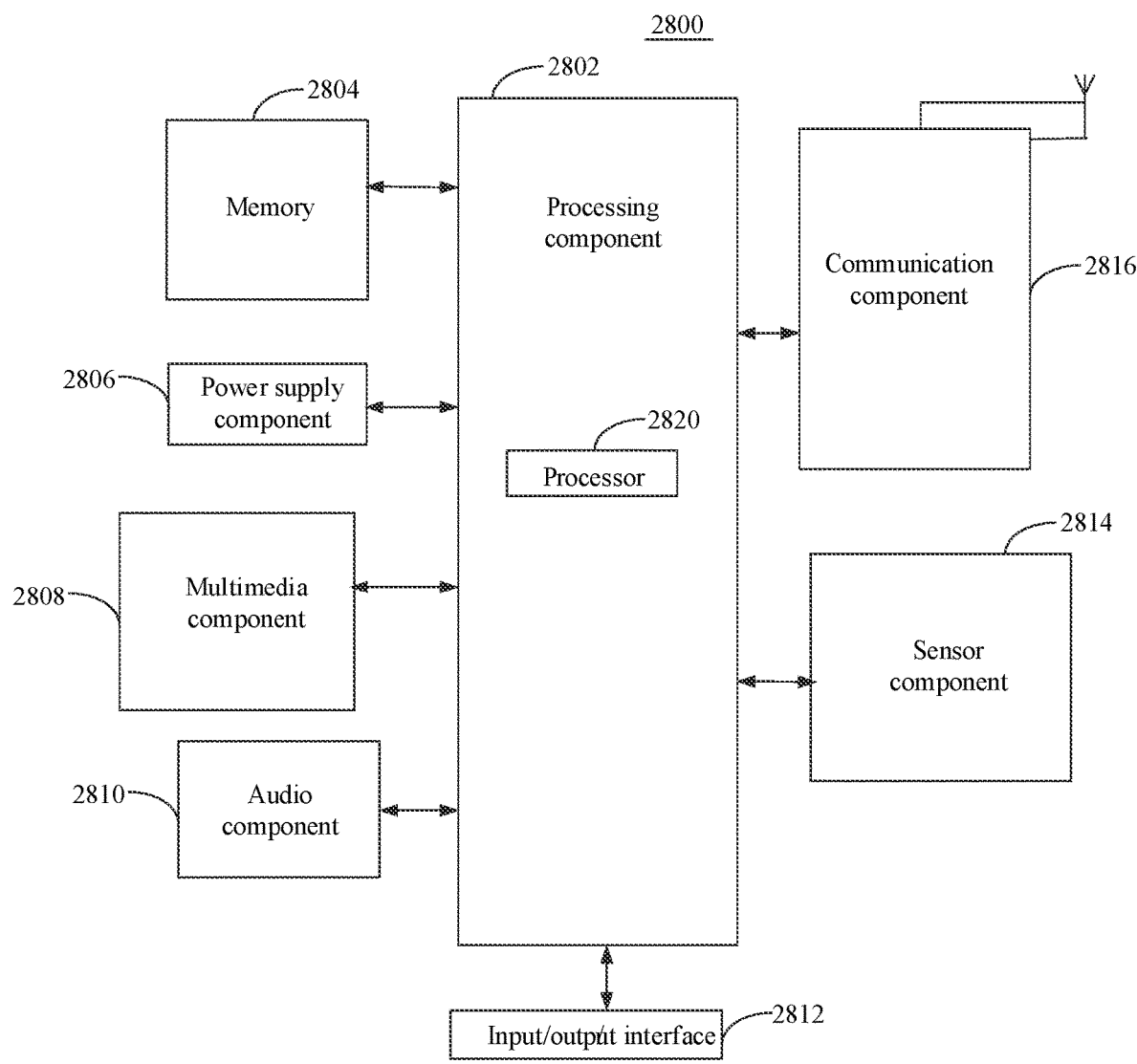
FIG. 28 is a schematic structural diagram of a terminal shown according to an exemplary embodiment of the present disclosure.

FIG. 28 is a schematic structural diagram of a terminal 2800 shown according to an exemplary embodiment. For example, the terminal 2800 may be a user equipment, which may specifically be a mobile phone, a computer, a digital broadcasting terminal, a messaging device, a game console, a tablet device, a medical device, a fitness device, a personal digital assistant, and a wearable device such as a smart watch and smart Glasses, a smart bracelet, smart running shoes, etc.

Referring to FIG. 28, the terminal 2800 may include one or more of the following components: a processing component 2802, a memory 2804, a power supply component 2806, a multimedia component 2808, an audio component 2810, an input/output (I/O) interface 2812, a sensor component 2814, and a communication component 2816.

The processing component 2802 generally controls the overall operations of the terminal 2800, such as operations associated with display, telephone calls, data communications, camera operations, and recording operations. The processing component 2802 may include one or more processors 2820 to execute instructions to complete all or part of the steps of the above-described methods. In addition, the processing component 2802 may include one or more modules to facilitate the interaction between the processing component 2802 and other components. For example, the processing component 2802 may include a multimedia module to facilitate the interaction between the multimedia component 2808 and the processing component 2802.

The memory 2804 is configured to store various types of data to support operations on the terminal 2800. Examples of these data include instructions for any application or method operated on the terminal 2800, contact data, phone book data, messages, pictures, videos, etc. The memory 2804 may be implemented by any type of volatile or non-volatile storage device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power supply component 2806 provides power to various components of the terminal 2800. The power supply component 2806 may include a power management system, one or more power supplies, and other components associated with generation, management, and distribution of power for the terminal 2800.

The multimedia component 2808 includes a screen providing an output interface between the aforementioned terminal 2800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The above-mentioned touch sensor may not only sense the boundary of the touch or sliding action, but also detect the duration and pressure related to the above-mentioned touch or sliding operation. In some embodiments, the multimedia component 2808 includes a front camera and/or a rear camera. When the device 2800 is in an operation mode, such as a shooting mode or a video mode, the front camera and/or the rear camera can receive external multimedia data. Each front camera and rear camera may be a fixed optical lens system or have focal length and optical zooming capabilities.

The audio component 2810 is configured to output and/or input audio signals. For example, the audio component 2810 includes a microphone (MIC). When the terminal 2800 is in an operation mode, such as a call mode, a recording mode, and a voice recognition mode, the microphone is configured to receive external audio signals. The received audio signals may be further stored in the memory 2804 or transmitted via the communication component 2816. In some embodiments, the audio component 2810 further includes a speaker for outputting audio signals.

The I/O interface 2812 provides an interface between the processing component 2802 and a peripheral interface module. The above-mentioned peripheral interface module may be a keyboard, a click wheel, a button, and the like. These buttons may include, but are not limited to: home button, volume button, start button, and lock button.

The sensor component 2814 includes one or more sensors, which are used to provide the terminal 2800 with various aspects of status assessment. For example, the sensor component 2814 can detect the on/off status of the device 2800 and the relative positioning of the components. For example, the above components are the display and keypad of the terminal 2800. The sensor component 2814 can also detect change in the position of the terminal 2800 or one component of the terminal 2800, presence or absence of contact between the user and the terminal 2800, orientation or acceleration/deceleration of the terminal 2800, and change in the temperature of the terminal 2800. The sensor component 2814 may include a proximity sensor configured to detect the presence of nearby objects when there is no physical contact. The sensor component 2814 may also include a light sensor, such as a CMOS or CCD image sensor, for use in imaging applications. In some embodiments, the sensor component 2814 may also include an acceleration sensor, a gyroscope sensor, a magnetic sensor, a pressure sensor or a temperature sensor.

The communication component 2816 is configured to facilitate wired or wireless communication between the terminal 2800 and other devices. The terminal 2800 can access a wireless network based on a communication standard, such as Wi-Fi, 2G, 3G, 4G LTE, 5G NR, or a combination thereof. In one exemplary embodiment, the communication component 2816 receives a broadcast signal or broadcast related information from an external broadcast management system via a broadcast channel. In one exemplary embodiment, the aforementioned communication component 2816 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the terminal 2800 may be implemented by one or more of application specific integrated circuits (ASIC), digital signal processors (DSP), digital signal processing devices (DSPD), programmable logic devices (PLD), field programmable gate arrays (FPGA), controllers, microcontrollers, microprocessors or other electronic components, to execute the above-described methods.

In an exemplary embodiment, a non-transitory computer-readable storage medium including instructions is also provided, such as the memory 2804 including instructions, the aforementioned instructions can be executed by the processor 2820 of the terminal 2800 to complete the methods for transmitting information shown in FIG. 6-FIG. 14. For example, the non-transitory computer-readable storage medium may be ROM, random access memory (RAM), CD-ROM, magnetic tape, floppy disk, and optical data storage device, etc.

Figure 29:
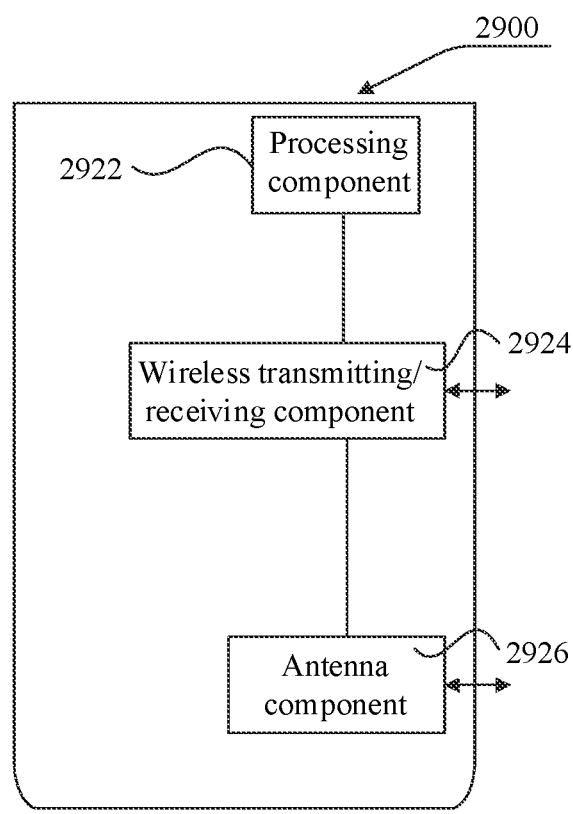
FIG. 29 is a schematic structural diagram of a base station shown according to an exemplary embodiment of the present disclosure.

As shown in FIG. 29, FIG. 29 is a schematic structural diagram of a base station 2900 shown according to an exemplary embodiment. 29. Referring to FIG. 29, the base station 2900 includes a processing component 2922, a wireless transmitting/receiving component 2924, an antenna component 2929, and a signal processing part specific to a wireless interface. The processing component 2922 may further include one or more processors.

One of the processors in the processing component 2922 may be configured to:
 perform a downlink data transmission by using an idle channel resource after a successful channel detection of an unlicensed spectrum resource;
 determine resource configuration information corresponding to a preceding downlink transmission resource used to carry the downlink data transmission, the resource configuration information at least including: time-domain resource configuration information;
 determine a scheduling instruction for the preceding downlink transmission resource according to the resource configuration information;
 send the scheduling instruction to a terminal, so as to enable the terminal to acquire target information sent by the base station from buffered data information according to the scheduling instruction.

In an exemplary embodiment, a non-transitory computer-readable storage medium including instructions is also provided, on which computer instructions are stored. The aforementioned computer instructions can be executed by the processing component 2922 of the base station 2900 to complete the methods for transmitting information shown in FIG. 1-FIG. 4. For example, the non-transitory computer-readable storage medium may be ROM, random access memory (RAM), CD-ROM, magnetic tape, floppy disk, and optical data storage device, etc.

After considering the specification and practicing the disclosure disclosed herein, those skilled in the art will easily think of other embodiments of the present disclosure. The present application is intended to cover any variations, uses, or adaptive changes of the present disclosure. These variations, uses, or adaptive changes follow the general principles of the present disclosure and include common knowledge or commonly used technical means in the technical field that are not disclosed in the present disclosure. The description and the embodiments are to be regarded as exemplary only, and the true scope and spirit of the present disclosure will be indicated by the following claims.

It should be appreciated that the present disclosure is not limited to the precise structure that has been described above and shown in the drawings, and various modifications and changes can be made without departing from its scope. The scope of the present disclosure is only limited by the appended claims.

What is claimed is:

1. A method for transmitting information, performed by a terminal, comprising:
   buffering data information carried by an unlicensed spectrum resource;
   acquiring a target scheduling instruction issued by a base station, the target scheduling instruction being configured to indicate resource configuration information of a preceding downlink transmission resource, and the preceding downlink transmission resource referring to an unlicensed spectrum resource that has completed transmission for downlink data before the base station issues scheduling information on the resource, wherein the acquiring the target scheduling instruction comprises:
      receiving a scheduling instruction issued by the base station;
      determining whether a current scheduling instruction includes the resource configuration information of the preceding downlink transmission resource; and
      determining that the current scheduling instruction belongs to the target scheduling instruction in response that the current scheduling instruction includes the resource configuration information of the preceding downlink transmission resource; and
   acquiring target information sent by the base station from the buffered data information according to the target scheduling instruction, comprising:
      determining a time-frequency range of the preceding downlink transmission resource according to the resource configuration information of the preceding downlink transmission resource; and
      parsing the target information from the buffered data information corresponding to the time-frequency range.

2. The method according to claim 1, wherein the buffering the data information carried by the unlicensed spectrum resource comprises one of the following:
   buffering the data information carried by the unlicensed spectrum resource in accordance with preset buffering indication information; or,
   buffering the data information carried by the unlicensed spectrum resource according to buffering indication information issued by the base station.

3. The method according to claim 2, wherein the buffering indication information comprises indication information of a buffering start time; wherein
   the buffering the data information carried by the unlicensed spectrum resource according to the buffering indication information issued by the base station comprises:
   determining a buffering start moment according to the indication information of the buffering start time; and starting the buffering of the data information carried by the unlicensed spectrum resource from the buffering start moment.

4. The method according to claim 1, wherein the acquiring the target scheduling instruction issued by the base station comprises:
   receiving a scheduling instruction issued by the base station;
   determining whether a current scheduling instruction includes a target information field, in which indication information of preset time-domain resource configuration information of a first-type is carried in the target information field, the preset time-domain resource configuration information of the first-type being time-domain resource configuration information at a time when the base station schedules the preceding downlink transmission resource, and being appointed by the system;
   determining that the current scheduling instruction belongs to the target scheduling instruction in response that the scheduling instruction includes the target information field.

5. The method according to claim 4, wherein the target scheduling instruction comprises the target information field; wherein
   the acquiring the target information sent by the base station from the buffered data information according to the scheduling instruction comprises:
   determining a time-domain range of the preceding downlink transmission resource according to the preset time-domain resource configuration information of the first-type corresponding to the indication information; and
   parsing the target information from the buffered data information corresponding to the time-domain range.

6. The method according to claim 1, wherein the acquiring the target scheduling instruction issued by the base station comprises:
   receiving a scheduling instruction issued by the base station;
   determining whether preset transmission characteristic information is included in transmission information of a current scheduling instruction, the preset transmission characteristic information being configured to indicate that the current scheduling instruction includes time-domain resource configuration information of the preceding downlink transmission resource; and
   determining that the current scheduling instruction belongs to the target scheduling instruction in response that the preset transmission characteristic information is included in the transmission information of the current scheduling instruction.

7. The method according to claim 6, wherein the preset transmission characteristic information includes at least one of the following:
   preset transmission position;
   preset downlink control information DCI format;
   preset radio network temporary identifier RNTI;
   preset scrambling sequence.

8. The method according to claim 6, wherein the acquiring the target information sent by the base station from the buffered data information according to the scheduling instruction comprises:
   determining preset time-domain resource configuration information of a second-type according to the target scheduling instruction, the preset time-domain resource configuration information of the second-type being time-domain resource configuration information at a time when the base station schedules a following downlink transmission resource, and being appointed by the system;

determining a time-domain range of the preceding downlink transmission resource according to the preset time-domain resource configuration information of the second-type;

parsing the target information from the buffered data information corresponding to the time-domain range.

9. A method for transmitting information, performed by a base station, comprising:

performing a downlink data transmission by using an idle channel resource after a successful channel detection of an unlicensed spectrum resource, comprising:

determining a time-domain range of a transmission region, the transmission region being a region corresponding to a resource available to an unlicensed spectrum; and performing the downlink data transmission by using the unlicensed spectrum resource corresponding to the time-domain range, wherein the determining the time-domain range of the transmission region comprises: determining the time-domain range of the transmission region in accordance with preset time-domain resource configuration information;

determining resource configuration information corresponding to a preceding downlink transmission resource for carrying the downlink data transmission, the resource configuration information at least including: time-domain resource configuration information;

determining a scheduling instruction for the preceding downlink transmission resource according to the resource configuration information;

sending the scheduling instruction to a terminal to enable the terminal to acquire target information sent by the base station from buffered data information according to the scheduling instruction;

in response that the preset time-domain resource configuration information is time-domain resource configuration information of a first-type at a time when scheduling the preceding downlink transmission resource, which is appointed by the system;

the determining the scheduling instruction for the preceding downlink transmission resource according to the resource configuration information comprises:

determining an information field configured to indicate the preset time-domain resource configuration information;

carrying indication information corresponding to the time-domain resource configuration information of the first-type in the information field, and generating the scheduling instruction.

10. The method according to claim 9, wherein the determining the time-domain range of the transmission region comprises:

determining the time-domain range of the transmission region in real time according to data volume of downlink data to be transmitted.

11. The method according to claim 10, wherein in response that the preset time-domain resource configuration information is time-domain resource configuration information of a second-type for scheduling a following downlink transmission resource, which is appointed by the system;

the determining the scheduling instruction for the preceding downlink transmission resource according to the resource configuration information comprises:

determining the time-domain resource configuration information of the second-type as the resource configuration information of the preceding downlink transmission resource, and generating the scheduling instruction;

the sending the scheduling instruction to the terminal comprises:

determining preset transmission characteristic information of the scheduling instruction, the preset transmission characteristic information being configured to indicate that the time-domain resource configuration information of the second-type is also applicable to time-domain configuration of the preceding downlink transmission resource;

sending the scheduling instruction to the terminal in accordance with the preset transmission characteristic information.

12. The method according to claim 11, wherein the transmission characteristic information of the scheduling instruction comprises at least one of the following:

preset transmission position;
preset downlink control information DCI format;
preset radio network temporary identifier RNTI;
preset scrambling sequence.

13. The method according to claim 9, wherein the determining the information field configured to indicate the preset time-domain resource configuration information comprises:

configuring position of the information field in a scheduling signaling and size of the information field to obtain configuration information of the information field;

before the sending the scheduling instruction to the terminal, the method further comprises:

sending the configuration information of the information field to the terminal.

14. The method according to claim 9, wherein, before the performing the downlink data transmission by using the idle channel resource, the method further comprises:

sending buffering indication information to the terminal, the buffering indication information being configured to indicate a time when the terminal starts to buffer data.

15. A terminal, comprising:

a processor;

a memory for storing instructions executable by the processor;

wherein the processor is configured to:

buffer data information carried by an unlicensed spectrum resource;

acquire a target scheduling instruction issued by a base station, the target scheduling instruction being configured to indicate resource configuration information of a preceding downlink transmission resource, and the preceding downlink transmission resource referring to the unlicensed spectrum resource that has completed transmission for downlink data before the base station issues scheduling information on the resource;

acquire target information sent by the base station from the buffered data information according to the target scheduling instructions;

wherein the processor is configured to acquire the target scheduling instruction by:

receiving a scheduling instruction issued by the base station;

determining whether a current scheduling instruction includes the resource configuration information of the preceding downlink transmission resource; and determining that the current scheduling instruction belongs to the target scheduling instruction in response that the current scheduling instruction includes the resource configuration information of the preceding downlink transmission resource;

wherein the processor is configured to acquire target information sent by the base station from the buffered data information according to the target scheduling instruction by:

determining a time-frequency range of the preceding downlink transmission resource according to the resource configuration information of the preceding downlink transmission resource; and parsing the target information from the buffered data information corresponding to the time-frequency range.

16. A base station, comprising:
a processor;
 a memory for storing instructions executable by the processor;
 wherein the processor is configured to perform the method as claimed in claim 9.

* * * * *